US012273660B2

(12) United States Patent
Carey

(10) Patent No.: US 12,273,660 B2
(45) Date of Patent: *Apr. 8, 2025

(54) VIDEO IDENTIFICATION AND ANALYTICAL RECOGNITION SYSTEM

(71) Applicant: James Carey, Commack, NY (US)

(72) Inventor: James Carey, Commack, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,119

(22) Filed: Aug. 14, 2023

(65) Prior Publication Data

US 2023/0388457 A1 Nov. 30, 2023

Related U.S. Application Data

(63) Continuation of application No. 16/823,710, filed on Mar. 19, 2020, now Pat. No. 11,743,431, which is a
(Continued)

(51) Int. Cl.
*H04N 7/18* (2006.01)
*G06F 18/25* (2023.01)
(Continued)

(52) U.S. Cl.
CPC ........... *H04N 7/181* (2013.01); *G06F 18/251* (2023.01); *G06T 7/20* (2013.01); *G06T 7/246* (2017.01);
(Continued)

(58) Field of Classification Search
None
See application file for complete search history.

(56) References Cited

U.S. PATENT DOCUMENTS 6,975,346 B2 12/2005 Kumhyr
7,308,487 B1 12/2007 Dansie et al.
(Continued)

FOREIGN PATENT DOCUMENTS

JP 2004005511 A 1/2004
JP 2008204079 A 9/2008
(Continued)

OTHER PUBLICATIONS

Canadian Office Action issued in corresponding application CA 3056190 dated Sep. 27, 2023.
(Continued)

*Primary Examiner* — Reza Aghevli
(74) *Attorney, Agent, or Firm* — Carter, DeLuca & Farrell LLP

(57) ABSTRACT

An analytical recognition system includes a video camera configured to capture video data of a subject and an antenna configured to capture mobile communication device data relating to the subject's mobile device. The system further includes a data analytics module configured to: analyze the video data to determine one of a physical attribute or a movement attribute of the subject and generate a first certainty match value based on this attribute perform facial recognition analysis of the subject to obtain facial recognition data and generate a second certainty match value based on the facial recognition data; generate a third certainty match value based on the mobile device data; and combine the first, second, and third certainty match values to produce a combined certainty match value, which enhances the accuracy of identifying the subject by integrating multiple data sources, including physical attributes, facial features, and mobile device information.

20 Claims, 12 Drawing Sheets

Related U.S. Application Data continuation-in-part of application No. 16/599,674, filed on Oct. 11, 2019, now Pat. No. 10,972,704, which is a continuation-in-part of application No. 16/571,522, filed on Sep. 16, 2019, now Pat. No. 11,039,108, which is a continuation of application No. 15/469,885, filed on Mar. 27, 2017, now Pat. No. 10,432,897, which is a continuation of application No. 14/817,871, filed on Aug. 4, 2015, now Pat. No. 9,762,865, which is a continuation-in-part of application No. 14/256,385, filed on Apr. 18, 2014, now Pat. No. 11,100,334, and a continuation-in-part of application No. 14/213,548, filed on Mar. 14, 2014, now Pat. No. 9,786,113.

(60) Provisional application No. 61/813,942, filed on Apr. 19, 2013, provisional application No. 61/798,740, filed on Mar. 15, 2013.

(51) Int. Cl.
| | | |
|---|---|---|
| *G06T 7/20* | (2017.01) | |
| *G06T 7/246* | (2017.01) | |
| *G06V 20/52* | (2022.01) | |
| *G06V 40/10* | (2022.01) | |
| *G06V 40/16* | (2022.01) | |
| *G06V 40/20* | (2022.01) | |
| *G08B 13/19* | (2006.01) | |
| *G08B 13/196* | (2006.01) | |
| *H04N 23/45* | (2023.01) | |
| *H04W 8/00* | (2009.01) | |

(52) U.S. Cl.
CPC .............. *G06V 20/52* (2022.01); *G06V 20/53* (2022.01); *G06V 40/10* (2022.01); *G06V 40/161* (2022.01); *G06V 40/23* (2022.01); *G08B 13/19608* (2013.01); *G08B 13/19613* (2013.01); *H04N 7/185* (2013.01); *H04N 23/45* (2023.01); *H04W 8/005* (2013.01); *G06T 2207/10016* (2013.01); *G06T 2207/30232* (2013.01); *G06V 40/172* (2022.01); *G06V 40/25* (2022.01); *G06V 2201/10* (2022.01)

(56) References Cited

U.S. PATENT DOCUMENTS

| | | | |
|---|---|---|---|
| 7,769,221 B1 | 8/2010 | Shakes | |
| 7,965,312 B2 | 6/2011 | Chung | |
| 8,195,598 B2 | 6/2012 | Hua et al. | |
| 8,271,336 B2* | 9/2012 | Mikurak | G06Q 50/12 705/7.29 |
| 8,615,254 B2 | 12/2013 | Jamtgaard et al. | |
| 8,879,831 B2* | 11/2014 | Kohli | G06V 10/426 382/153 |
| 9,406,336 B2* | 8/2016 | Bose | A63F 13/00 |
| 9,762,865 B2* | 9/2017 | Carey | H04N 7/181 |
| 9,773,163 B2 | 9/2017 | Carey | |
| 9,786,113 B2* | 10/2017 | Carey | G07F 9/026 |
| 10,078,787 B2 | 9/2018 | Carey | |
| 10,432,897 B2* | 10/2019 | Carey | H04N 7/181 |
| 10,972,704 B2* | 4/2021 | Carey | G06T 7/246 |
| 11,039,108 B2* | 6/2021 | Carey | H04W 4/029 |
| 11,100,334 B2* | 8/2021 | Carey | G08B 13/19608 |
| 11,743,431 B2* | 8/2023 | Carey | G06F 18/251 348/150 |
| 2001/0010541 A1 | 8/2001 | Fernandez | |
| 2003/0067542 A1 | 4/2003 | Monroe | |
| 2003/0197612 A1 | 10/2003 | Tanaka et al. | |
| 2004/0117638 A1 | 6/2004 | Monroe | |
| 2004/0143602 A1 | 7/2004 | Ruiz | |
| 2004/0161133 A1 | 8/2004 | Elazar et al. | |
| 2006/0064384 A1 | 3/2006 | Mehrotra | |
| 2006/0244826 A1 | 11/2006 | Chew | |
| 2007/0003141 A1 | 1/2007 | Rittscher et al. | |
| 2007/0057049 A9 | 3/2007 | Kundu et al. | |
| 2007/0127774 A1 | 6/2007 | Zhang et al. | |
| 2007/0297607 A1 | 12/2007 | Ogura et al. | |
| 2008/0015013 A1* | 1/2008 | Gelman | G07F 17/3241 463/25 |
| 2008/0018738 A1* | 1/2008 | Lipton | G06V 20/52 348/E7.087 |
| 2008/0106599 A1 | 5/2008 | Liu et al. | |
| 2008/0198231 A1 | 8/2008 | Ozdemir et al. | |
| 2009/0033745 A1 | 2/2009 | Yeredor et al. | |
| 2009/0052747 A1 | 2/2009 | Kamiyama et al. | |
| 2009/0141939 A1* | 6/2009 | Chambers | G08B 13/19613 382/103 |
| 2009/0189981 A1 | 7/2009 | Siann et al. | |
| 2009/0222388 A1* | 9/2009 | Hua | G06N 5/02 382/103 |
| 2009/0268030 A1 | 10/2009 | Markham | |
| 2010/0026802 A1 | 2/2010 | Titus et al. | |
| 2010/0079594 A1 | 4/2010 | Voglewede et al. | |
| 2010/0111377 A1 | 5/2010 | Monroe | |
| 2010/0135643 A1 | 6/2010 | Fleming | |
| 2010/0141786 A1* | 6/2010 | Bigioi | G06V 40/161 348/222.1 |
| 2010/0182428 A1 | 7/2010 | Lu et al. | |
| 2010/0234986 A1 | 9/2010 | Clopton | |
| 2010/0260426 A1* | 10/2010 | Huang | G06F 18/217 707/E17.031 |
| 2010/0311347 A1* | 12/2010 | Le Thierry D'Ennequin | H04W 8/005 455/67.11 |
| 2010/0318566 A1 | 12/2010 | Yoshio et al. | |
| 2010/0321183 A1 | 12/2010 | Donovan et al. | |
| 2010/0329513 A1 | 12/2010 | Klefenz | |
| 2011/0022661 A1* | 1/2011 | Alsina | G06V 40/172 709/205 |
| 2011/0128374 A1 | 6/2011 | Shellshear et al. | |
| 2011/0134240 A1* | 6/2011 | Anderson | H04W 4/38 348/143 |
| 2011/0211070 A1 | 9/2011 | Shu et al. | |
| 2011/0273309 A1* | 11/2011 | Zhang | A61B 5/0013 340/870.07 |
| 2012/0008836 A1 | 1/2012 | Bobbitt et al. | |
| 2012/0076356 A1* | 3/2012 | Li | G08B 13/19602 382/103 |
| 2012/0114198 A1* | 5/2012 | Yang | G06V 40/162 382/118 |
| 2012/0127314 A1 | 5/2012 | Clements | |
| 2012/0147169 A1* | 6/2012 | Harper | G06Q 30/0204 348/E7.085 |
| 2012/0190380 A1* | 7/2012 | Dupray | G01S 5/0278 455/456.1 |
| 2012/0208592 A1 | 8/2012 | Davis et al. | |
| 2012/0218412 A1* | 8/2012 | Dellantoni | G01C 21/3602 348/148 |
| 2012/0229647 A1 | 9/2012 | Calman et al. | |
| 2012/0233032 A1 | 9/2012 | Calman et al. | |
| 2012/0233033 A1 | 9/2012 | Calman et al. | |
| 2012/0262575 A1 | 10/2012 | Champagne et al. | |
| 2012/0311564 A1 | 12/2012 | Khalid | |
| 2012/0324061 A1 | 12/2012 | Parsons et al. | |
| 2012/0327241 A1 | 12/2012 | Howe | |
| 2013/0015946 A1* | 1/2013 | Lau | G06V 40/172 340/5.2 |
| 2013/0027561 A1* | 1/2013 | Lee | H04N 23/611 705/7.41 |
| 2013/0030875 A1* | 1/2013 | Lee | G06Q 30/0601 705/14.58 |
| 2013/0041961 A1 | 2/2013 | Thrower, III et al. | |
| 2013/0063550 A1 | 3/2013 | Ritchey | |
| 2013/0073366 A1 | 3/2013 | Heath | |
| 2013/0101159 A1* | 4/2013 | Chao | G06V 20/52 382/103 |

(56) References Cited

U.S. PATENT DOCUMENTS

| | | | | |
|---|---|---|---|---|
| 2013/0155229 | A1* | 6/2013 | Thornton | H04N 7/18 348/143 |
| 2013/0271598 | A1 | 10/2013 | Mariadoss | |
| 2014/0018059 | A1 | 1/2014 | Noonan | |
| 2014/0052680 | A1* | 2/2014 | Nitz | G06N 5/04 706/46 |
| 2014/0052681 | A1* | 2/2014 | Nitz | G06N 5/048 706/46 |
| 2014/0132767 | A1* | 5/2014 | Sonnabend | G06V 20/63 348/148 |
| 2014/0201126 | A1* | 7/2014 | Zadeh | A61B 5/165 706/52 |
| 2014/0285660 | A1 | 9/2014 | Jamtgaard et al. | |
| 2014/0309863 | A1* | 10/2014 | Ricci | H04W 4/12 701/36 |
| 2014/0316616 | A1* | 10/2014 | Kugelmass | G08G 5/0013 701/8 |
| 2014/0357312 | A1* | 12/2014 | Davis | H04N 23/70 455/550.1 |
| 2015/0054639 | A1* | 2/2015 | Rosen | H04W 4/80 340/439 |
| 2015/0106628 | A1* | 4/2015 | Holman | G06F 21/6245 713/189 |
| 2015/0163345 | A1* | 6/2015 | Cornaby | G06F 3/002 345/633 |
| 2015/0189240 | A1 | 7/2015 | Shmueli | |
| 2015/0223731 | A1* | 8/2015 | Sahin | A61B 5/16 600/595 |
| 2015/0317801 | A1* | 11/2015 | Bentley | G08B 21/043 382/107 |
| 2015/0318015 | A1* | 11/2015 | Bose | G08B 21/043 386/248 |
| 2015/0341599 | A1 | 11/2015 | Carey | |
| 2016/0292881 | A1* | 10/2016 | Bose | G11B 27/10 |
| 2016/0322078 | A1* | 11/2016 | Bose | G11B 20/10527 |
| 2017/0200052 | A1 | 7/2017 | Carey | |
| 2019/0172293 | A1 | 6/2019 | Carey | |
| 2020/0014885 | A1* | 1/2020 | Carey | H04N 7/181 |
| 2020/0045267 | A1 | 2/2020 | Carey | |
| 2020/0221054 | A1* | 7/2020 | Carey | H04N 5/265 |

FOREIGN PATENT DOCUMENTS

| | | |
|---|---|---|
| JP | 201351336 A | 4/2013 |
| RU | 83675 U1 | 6/2009 |
| RU | 2382408 C2 | 2/2010 |
| RU | 2459267 C2 | 8/2012 |
| WO | 2007139994 A2 | 12/2007 |
| WO | 2009111498 A2 | 9/2009 |
| WO | 2011001180 A1 | 1/2011 |
| WO | 2011071720 A1 | 6/2011 |
| WO | 2012102909 A1 | 8/2012 |
| WO | 2012170551 A2 | 12/2012 |
| WO | 2013030296 A1 | 3/2013 |
| WO | 2014155958 A1 | 10/2014 |

OTHER PUBLICATIONS

Thailand Office Action dated May 25, 2020 issued in corresponding Thailand Appln. No. 1501006385.
Extended European Search Report dated May 14, 2020 issued in corresponding EP Appln. No. 20153816.2.
Brazilian Office Action dated Feb. 27, 2020 corresponding to counterpart Patent Application BR 112015026374.
Extended European Search Report dated Nov. 22, 2016, in connection with EP Application No. 16193237, 7 pages.
"Real-time Monitoring for Crowd Counting using Video Surveillance and GIS," H. Song et al., IEEE, 2nd International Conference on Remote Sensing, Environment and Transportation Engineering (RSETE), Jun. 1, 2012, 4 pages.
International Search Report and Written Opinion dated Sep. 1, 2016, in connection with International Application No. PCT/US16/45371 (12 pages).
Daniel A. Vaquero et al., "Attribute-Based People Search," Chapter 14, Intellegent Video Surveillance: Systems and Technology, published Dec. 7, 2009, pp. 387-405.
Extended European Search Report issued in European Patent Application No. 14723302.7 dated Mar. 2, 2016, 11 pages.
International Search Report for PCT/US14/28940 dated Aug. 27, 2014.
International Search Report for PCT Application Serial No. PCT/US2014/034633, dated Dec. 2, 2014.
Extended European Search Report for corresponding application No. EP 14 76 4242 dated Aug. 26, 2015.
International Preliminary Search Report for PCT Application Serial No. PCT/US2014/034633, dated Oct. 29, 2015, 7 bages.
International Preliminary Search Report for PCT Application Serial No. PCT/US2013/070067, dated Sep. 15, 2015, 6 pages.
"Configuration Backup Restore", Jun. 30, 2010, XP055127450, retrieved from the Internet: URL: https:\\downloads.avaya.com/css/P8/documents/100088380.
Russian Office Action dated May 2, 2017 in corresponding Russian Patent Application No. 2015147449 with English translation, 8 pages.
Russian Office Action dated Oct. 23, 2017 in corresponding Russian Patent Application No. 2015147449, together with English translation, 12 pages.
Canadian Office Action issued in Appl. No. CA 2,851,732 dated Dec. 12, 2017 (4 pages).
International Preliminary Report on Patentability and Written Opinion of the International Searching Authority Issed in Int'l Appl. No. PCT/US2016/045371 dated Feb. 15, 2018 (10 pages).
European Examination Report issued in Appl. No. EP 14723302.7 dated Mar. 2, 2018 (5 pages).
https://www.nytimes.com/2013/07/15/business/attention-shopper-stores-are-t-racking-your-cell.html?_r=1& [retrieved on Aug. 2, 2018].
Supplementary European Search Report dated Jul. 6, 2018 issued in corresponding EP Appln. No. 16833814.3.
Canadian Office Action dated May 25, 2018 issued in corresponding CA Appln. No. 2,973,866.
European Office Action dated Jul. 9, 2019 issued in corresponding EP Appln. No. 16 833 814.3.
International Search Report for corresponding application No. EP 14 76 4242 dated Aug. 26, 2015.
Daniel A. Vaquero et al., "Attribute-Based People Search," Chapter 14, Intellegent Video Surveillance: Systems and Technology, published Dec. 16, 2009, pp. 387-405.
Supplementary European Search Report issued in corresponding European Patent Application No. 14723302.7 dated Mar. 2, 2016, 11 pages.
Russian Office Action dated Jan. 18, 2017 in corresponding Russian Patent Application No. 2015147449 together with English translation, 12 pages.
Smith, K., et al. "Detecting Abandoned Luggage Items in a Public Space," IEEE Performance Evaluation of Tracking and Surveillance Workshop (PETS), IDIAP Research Report, Jun. 2006, pp. 1-14.
International Preliminary Search Report for corresponding PCT Application Serial No. PCT/US2014/034633, dated Oct. 29, 2015, 7 pages.
https://www.nytimes.com/2013/07/15/business/attention-shopper-stores-are-t-racking-your-cell.html?_r=1& [retrieved on Aug. 1, 2018].
Russian Office Action dated Oct. 14, 2019 corresponding to counterpart Patent Application RU 2018104654/07 (006960).
European Office Action dated Dec. 2, 2019 corresponding to counterpart Patent Application EP 14723302.7.
Russian Search Report completed Sep. 11, 2019 corresponding to counterpart Patent Application RU 2018104654/07 (006960).
Japanese Office Action dated Jul. 20, 2020 issued in corresponding JP Appln. No. 2018-526490.
Brazilian Office Action dated Aug. 17, 2020 issued in corresponding BR Appln. No. BR112018002281-0.
European Examination Report dated Sep. 24, 2020 issued in corresponding EP Appln. No. 16 193 237.1.

(56) References Cited

OTHER PUBLICATIONS

Canadian Office Action dated Nov. 25, 2020 issued in corresponding CA Appln. No. 3,056,190.
Extended European Search Report dated Dec. 11, 2020 issued in corresponding EP Appln. No. 20201200.1.
Russian Office Action dated Oct. 14, 2019 corresponding to counterpart Patent Application RU 2018104654/07.
Clifford et al.: "Attention, Shoppers: Store is Tracking Your Cell," The New York Times, available at https://www.nytimes.com/2013/07/15/business/attention-shopper-stores-are-tracking-your-cell.html?_r=1& [retrieved on Aug. 2, 2018].
Russian Search Report completed Sep. 11, 2019 corresponding to counterpart Patent Application RU 2018104654/07.
European Decision dated Dec. 2, 2019 corresponding to counterpart Patent Application EP 14723302.7.
Canadian Office Action dated Oct. 26, 2021 issued in corresponding CA Appln. No. 3,056,190.
Canadian Office Action issued in corresponding application CA 3,056,190 dated Oct. 26, 2021 (4 pages).
European Examination Report dated Mar. 11, 2022 issued in corresponding EP Appln. No. 20 153 816.2.
Canadian Office Action issued in corresponding application CA 2,994,712 dated Jan. 17, 2023 (4 pages).
Canadian Office Action issued in corresponding application CA 3,056,190 dated Jan. 19, 2023 (4 pages).
Canadian Office Action issued in corresponding application 3,095,814 dated Jun. 27, 2023 (4 pages).
Office Action issued in corresponding Canadian Application No. 2,994,712 dated Dec. 6, 2023 (4 pages).
Office Action issued in corresponding Brazilian Application BR 11 2018 002281 0 published Apr. 24, 2024, together with English language machine translation prepared by DeepL (8 pages).
Office Action issued in corresponding Brazilian Application No. BR112018002281-0 dated Oct. 21, 2024, together with English language translation (7 pages).

* cited by examiner

VIDEO IDENTIFICATION AND ANALYTICAL RECOGNITION SYSTEM

CROSS-REFERENCE TO RELATED APPLICATIONS

The present application is a continuation of U.S. patent application Ser. No. 16/823,710, filed on Mar. 19, 2020, now U.S. Pat. No. 11,743,431, which is a continuation-in-part of U.S. patent application Ser. No. 16/599,674, filed on Oct. 11, 2019, now U.S. Pat. No. 10,972,704, which is a continuation-in-part of U.S. patent application Ser. No. 16/571,522, filed on Sep. 16, 2019, now U.S. Pat. No. 11,039,108, which is a continuation of U.S. patent application Ser. No. 15/469,885, filed on Mar. 27, 2017, now U.S. Pat. No. 10,432,897, which is a continuation of U.S. patent application Ser. No. 14/817,871, filed on Aug. 4, 2015, now U.S. Pat. No. 9,762,865, which is a continuation-in-part of U.S. patent application Ser. No. 14/256,385 filed on Apr. 18, 2014, now U.S. Pat. No. 11,100,334, which claims priority to, and the benefit of, U.S. Provisional Patent Application No. 61/813,942 filed on Apr. 19, 2013. U.S. patent application Ser. No. 14/817,871 is also a continuation-in-part of U.S. patent application Ser. No. 14/213,548, filed on Mar. 14, 2014, now U.S. Pat. No. 9,786,113, which claims priority to, and the benefit of, U.S. Provisional Patent Application No. 61/798,740 filed on Mar. 15, 2013. The entire disclosures of each of the foregoing applications are hereby incorporated by reference herein.

BACKGROUND

Technical Field

The following relates to video observation, surveillance and verification systems and methods of use. The specific application may work in conjunction with surveillance systems, street cameras, personal video, in-store camera systems, parking lot camera systems, etc. and is configured to provide real time and/or post time data analysis of one or more video streams.

Background of Related Art

Companies are continually trying to identify specific user behavior in order to improve the throughput and efficiency of the company. For example, by understanding user behavior in the context of the retail industry, companies can both improve product sales and reduce product shrinkage. Focusing on the latter, employee theft is one of the largest components of retail inventory shrink. Therefore, companies are trying to understand user behavior in order to reduce and ultimately eliminate inventory shrinkage.

Companies have utilized various methods to prevent employee shrinkage. Passive electronic devices attached to theft-prone items in retail stores are used to trigger alarms, although customers and/or employees may deactivate these devices before an item leaves the store. Some retailers conduct bag and/or cart inspections for both customers and employees while other retailers have implemented loss prevention systems that incorporate video monitoring of POS transactions to identify transactions that may have been conducted in violation of implemented procedures. Most procedures and technologies focus on identifying individual occurrences instead of understanding the underlying user behaviors that occur during these events. As such, companies are unable to address the underlying condition that allows individuals to commit theft.

Surveillance systems, street camera systems, store camera systems, parking lot camera systems, and the like are widely used. In certain instances, camera video is continually streaming and a buffer period of 8, 12, 24, 48 hours, for example, is used and then overwritten should a need not arise for the video. In other systems, a longer period of time may be utilized or the buffer is weeks or months of data being stored and saved for particular purposes. As can be appreciated, when an event occurs, the video is available for review and analysis of the video data. In some instances, the video stream captures data and analyzes various pre-determined scenarios based upon automatic, user input, or programming depending upon a particular purpose. For example, the video may be programmed to follow moving objects from entry into a store and throughout the store for inventory control and/or video monitoring of customers.

In other instances, police, FBI or rescue personal need to review the various camera systems in a particular area or arena for investigative purposes, e.g., to track suspects, for car accident review, or other video evidence necessary to their investigation. As is often the case, snippets of video from various camera systems throughout the area can be critical in piecing together a visual map of the event in question. In other scenarios, an individual's habits or behaviors may become suspicious and deserved of monitoring or tracking for real-time analysis and alerts and/or post time investigative analysis.

There exists a need to further develop this analytical technology and provide real time and post time analysis of video streams for security and investigative purposes and for marketing purposes.

SUMMARY

According to one embodiment of the present disclosure, an analytical recognition system is disclosed. The system includes a video camera configured to capture video data of a subject and an antenna configured to capture mobile communication device data relating to a mobile communication device of the subject. The system further includes a data analytics module configured to: analyze the video data to determine at least one of a physical attribute or a movement attribute of the subject and generate; generate a first certainty match value based on the at least one of the physical attribute or the movement attribute of the subject; and perform a facial recognition analysis of the subject to obtain facial recognition data. The data analytics module is further configured to generate a second certainty match value based on the facial recognition data; generate a third certainty match value based on the mobile communication device data; and generate a combined certainty match value based on the first certainty match value, the second certainty match value, and the third certainty match value.

According to one aspect of the above embodiment, the video camera is at least one of a traffic camera or an aerial drone camera.

According to another aspect of the above embodiment, the data analytics module is further configured to access: an attributes database storing a plurality of subject identities and corresponding attributes; a facial database storing a plurality of subject identities and corresponding facial recognition datasets; and a device database storing a plurality of subject identities and corresponding mobile communication devices.

According to a further aspect of the above embodiment, the data analytics module is further configured to compare the combined certainty match to a certainty threshold and to output a positive match in response to the combined certainty match exceeding the certainty threshold.

According to one aspect of the above embodiment, the captured video data includes at least one of a captured still image and video footage.

According to another aspect of the above embodiment, the mobile communication device data includes at least one of a WiFi identifier, a media access control (MAC) identifier, a Bluetooth identifier, a cellular identifier, a near field communication identifier, and a radio frequency identifier associated with a mobile communication device in communication with the antenna.

According to another embodiment of the present disclosure, a method for analytical recognition of subjects is disclosed. The method includes: capturing video data of a subject from a video camera; capturing mobile communication device data relating to a mobile communication device of the subject from an antenna; and analyzing the video data to determine at least one of a physical attribute or a movement attribute of the subject and generate. The method further includes generating a first certainty match value based on the at least one of the physical attribute or the movement attribute of the subject; performing a facial recognition analysis of the subject to obtain facial recognition data; generating a second certainty match value based on the facial recognition data; generating a third certainty match value based on the mobile communication device data; and generating a combined certainty match value based on the first certainty match value, the second certainty match value, and the third certainty match value.

According to one aspect of the above embodiment, the video camera is at least one of a traffic camera or an aerial drone camera.

According to another aspect of the above embodiment, the method further includes accessing an attributes database storing a plurality of subject identities and corresponding attributes; accessing a facial database storing a plurality of subject identities and corresponding facial recognition datasets; and accessing a device database storing a plurality of subject identities and corresponding mobile communication devices.

According to a further aspect of the above embodiment, the method further includes: comparing the combined certainty match to a certainty threshold and to output a positive match in response to the combined certainty match exceeding the certainty threshold.

According to one aspect of the above embodiment, the captured video data includes at least one of a captured still image and video footage.

According to yet another aspect of the above embodiment, the mobile communication device data includes at least one of a WiFi identifier, a media access control (MAC) identifier, a Bluetooth identifier, a cellular identifier, a near field communication identifier, and a radio frequency identifier associated with a mobile communication device in communication with the antenna.

DEFINITIONS

Figure 1:
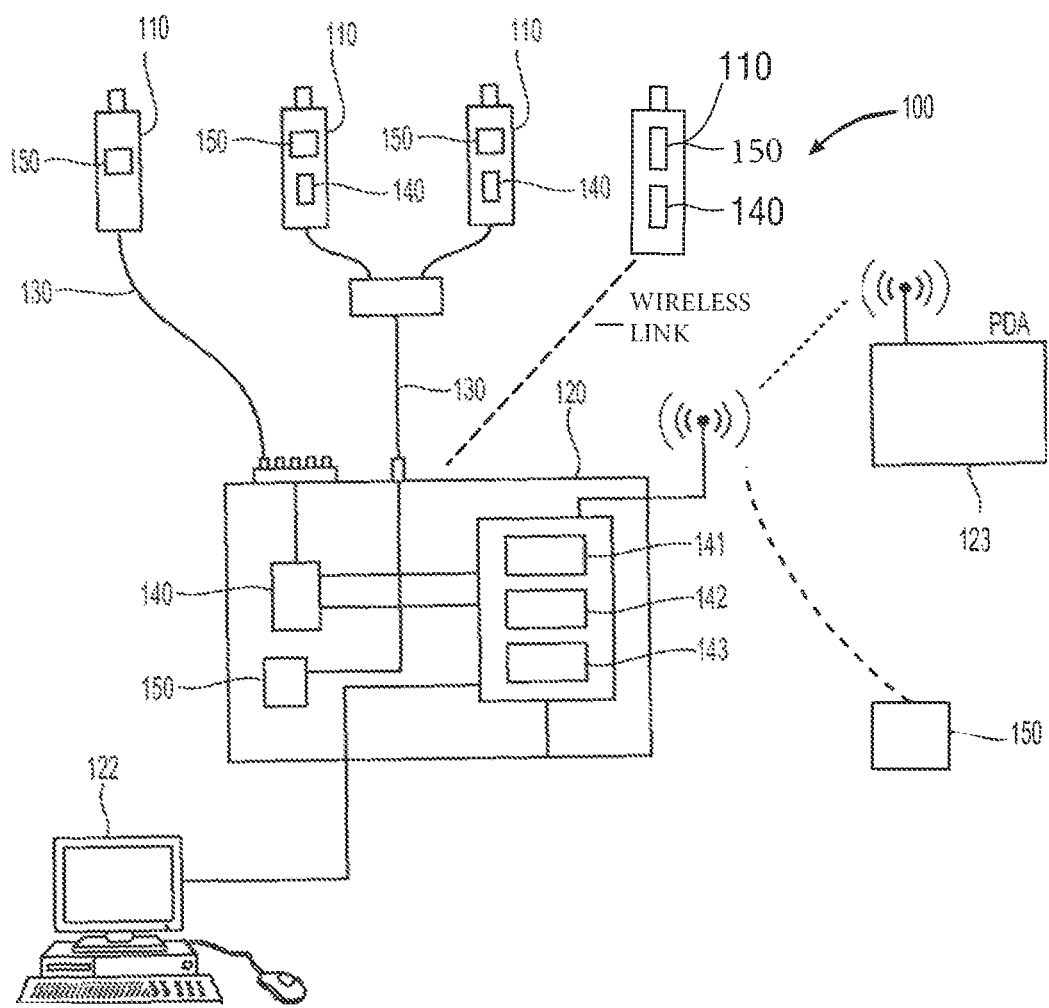
FIG. 1 is a system block diagram of an embodiment of a video observation, surveillance and verification system in accordance with the present disclosure.

The following definitions are applicable throughout this disclosure (including above).

A "video camera" may refer to an apparatus for visual recording. Examples of a video camera may include one or more of the following: a video imager and lens apparatus; a video camera; a digital video camera; a color camera; a monochrome camera; a camera; a camcorder; a PC camera; a webcam; an infrared (IR) video camera; a low-light video camera; a thermal video camera; a closed-circuit television (CCTV) camera; a pan/tilt/zoom (PTZ) camera; and a video sensing device. A video camera may be positioned to perform observation of an area of interest.

"Video" may refer to the motion pictures obtained from a video camera represented in analog and/or digital form. Examples of video may include: television; a movie; an image sequence from a video camera or other observer; an image sequence from a live feed; a computer-generated image sequence; an image sequence from a computer graphics engine; an image sequence from a storage device, such as a computer-readable medium, a digital video disk (DVD), or a high-definition disk (HDD); an image sequence from an IEEE 1394-based interface; an image sequence from a video digitizer; or an image sequence from a network.

"Video data" is a visual portion of the video.

"Non-video data" is non-visual information extracted from the video data.

A "video sequence" may refer to a selected portion of the video data and/or the non-video data.

"Video processing" may refer to any manipulation and/or analysis of video data, including, for example, compression, editing, and performing an algorithm that generates non-video data from the video.

A "frame" may refer to a particular image or other discrete unit within video.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant 123 (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system on a chip (SoC), or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; interpreted code; computer programs; and programmed logic. In this description, the terms "software" and "code" may be applicable to software, firmware, or a combination of software and firmware.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash removable memory; a memory chip; and/or other types of media that may store machine-readable instructions thereon. "Non-transitory" computer-readable medium include all computer-readable medium, with the sole exception being a transitory, propagating signal.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

"Real time" analysis or analytics generally refers to processing real time or "live" video and providing near instantaneous reports or warnings of abnormal conditions (pre-programmed conditions), abnormal scenarios (loitering, convergence, separation of clothing articles or backpacks, briefcases, groceries for abnormal time, etc.) or other scenarios based on behavior of elements (customers, patrons, people in crowd, etc.) in one or multiple video streams.

"Post time" analysis or analytics generally refers to processing stored or saved video from a camera source (from a particular camera system (e.g., store, parking lot, street) or other video data (cell phone, home movie, etc.)) and providing reports or warnings of abnormal conditions (post-programmed conditions), abnormal scenarios (loitering, convergence, separation of clothing articles or backpacks, briefcases, groceries for abnormal time, etc. or other scenarios based on behavior of elements (customers, patrons, people in crowd, etc.) in one or more stored video streams.

"Mobile communication device data" generally refers to data transmitted by, and/or obtained from, a mobile communication device by way of a wireless or wired communication protocol.

DETAILED DESCRIPTION

Particular embodiments of the present disclosure are described hereinbelow with reference to the accompanying drawings; however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements that may perform the same, similar, or equivalent functions.

Additionally, the present disclosure may be described herein in terms of functional block components, code listings, optional selections, page displays, and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C #, Java, COBOL, assembler, PERL, Python, PHP, or the like, with the various algorithms being implemented with any combination of data structures, objects, processes, routines or other programming elements. The object code created may be executed on a variety of operating systems including, without limitation, Windows®, Macintosh OSX®, iOS®, Linux, and/or Android®.

Further, it should be noted that the present disclosure may employ any number of conventional techniques for data transmission, signaling, data processing, network control, and the like. It should be appreciated that the particular implementations shown and described herein are illustrative of the disclosure and its best mode and are not intended to otherwise limit the scope of the present disclosure in any way. Examples are presented herein which may include sample data items (e.g., names, dates, etc.) which are intended as examples and are not to be construed as limiting. Indeed, for the sake of brevity, conventional data networking, application development and other functional aspects of the systems (and components of the individual operating components of the systems) may not be described in detail herein. Furthermore, the connecting lines shown in the various figures contained herein are intended to represent example functional relationships and/or physical or virtual couplings between the various elements. It should be noted that many alternative or additional functional relationships or physical or virtual connections may be present in a practical electronic data communications system.

As will be appreciated by one of ordinary skill in the art, the present disclosure may be embodied as a method, a data processing system, a device for data processing, and/or a computer program product. Accordingly, the present disclosure may take the form of an entirely software embodiment, an entirely hardware embodiment, or an embodiment combining aspects of both software and hardware. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., USB thumb drives) and/or the like.

In the discussion contained herein, the terms "user interface element" and/or "button" are understood to be non-limiting, and include other user interface elements such as, without limitation, a hyperlink, clickable image, and the like.

The present disclosure is described below with reference to block diagrams and flowchart illustrations of methods, apparatus (e.g., systems), and computer program products according to various aspects of the disclosure. It will be understood that each functional block of the block diagrams and the flowchart illustrations, and combinations of functional blocks in the block diagrams and flowchart illustrations, respectively, can be implemented by computer program instructions. These computer program instructions may be loaded onto a general-purpose computer, special purpose computer, mobile device or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems that perform the specified functions or steps, or suitable combinations of special purpose hardware and computer instructions.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential."

With reference to FIG. 1, an analytical recognition system including video observation, surveillance and verification according to an embodiment of this disclosure is shown as 100. System 100 is a network video and data recorder that includes the ability to record video from one or more cameras 110 (e.g., analog and/or IP camera) and other data obtained by way of one or more antennae 150. Video cameras 110 connect to a computer 120 across a connection 130. Connection 130 may be an analog connection that provides video to the computer 120, a digital connection that provides a network connection between the video camera 110 and the computer 120, or the connection 130 may include an analog connection and a digital connection.

Each video camera 110 connects to the computer 120 and a user interface 122 to provide a user connection to the computer 120. The one or more video cameras 110 may each connect via individual connections and may connect through a common network connection, or through any combination thereof.

The one or more antennae 150 may be affixed to, or included within, the one or more video cameras 110 or the computer 120, and/or may be located remote from the one or more video cameras 110 and the computer 120. The one or more antennae 150 may be communicatively coupled to the computer 120 by way of the connection 130 or may wirelessly communicate with the computer 120 by way of an antenna of the computer 120.

The one or more antennae 150 may be any one or a combination of various types of antennae. Example types of the one or more antennae 150 include a WiFi antenna, a media access control (MAC) antenna, a Bluetooth antenna, a cellular antenna, a near field communication antenna, a radio frequency identification (RFID) antenna, and a global positioning system (GPS) antenna. It should be understood that the example arrangement of the antennae 150 shown in FIG. 1 is provided for illustrative purposes only, and other configurations of the antennae 150 are contemplated. For instance, a single camera 110 may include a plurality of antennae of different types.

As discussed in more detail herein, the one or more antennae 150 are configured to capture mobile communication device data from one or more mobile communication devices (e.g., smartphones) located within a range of the one or more antennae 150 and transmit the captured mobile communication device data to a data analytics module 140 for processing in accordance with various example embodiments herein. The antenna 150 may be configured to capture the mobile communication device data by wirelessly receiving data transmitted by a mobile communication device that is located within a range of the antenna. The antenna 150 may be configured to wirelessly receive data from nearby mobile communication devices by periodically or continually pinging mobile communication devices and/or by being configured to periodically or continually listen for and capture data transmitted by nearby mobile communication devices without using pinging.

System 100 includes at least one data analytics module 140. A data analytics module 140 may reside in the computer 120 and/or in one or more of the video cameras 110. Data analytics module 140 performs processing of the video and/or the mobile communication device data. For instance, data analytics module 140 performs one or more algorithms to generate non-video data from video and/or from the mobile communication device data. Non-video data includes non-video frame data that describes content of individual frames such as, for example, objects identified in a frame, one or more properties of objects identified in a frame and one or more properties related to a pre-defined portions of a frame. Non-video data may also include non-video temporal data that describes temporal content between two or more frames. Non-video temporal data may be generated from video and/or the non-video frame data. Non-video temporal data includes temporal data such as temporal properties of an object identified in two or more frames and a temporal property of one or more pre-defined portions of two or more frames. Non-video frame data may include a count of objects identified (e.g., objects may include people and/or any portion thereof, inanimate objects, animals, vehicles or a user defined and/or developed object) and one or more object properties (e.g., position of an object, position of any portion of an object, dimensional properties of an object, dimensional properties of portions and/or identified features of an object) and relationship properties (e.g., a first object position with respect to a second object), or any other object that may be identified in a frame. Objects may be identified as objects that appear in video or objects that have been removed from video. Objects may be identified as virtual objects that do not actually appear in video but which may be added for investigative purposes, training purposes, or other purposes.

In various example embodiments herein, the data analytics module 140 is configured to correlate video data and mobile communication device data captured by video cameras and antennae, respectively, to generate a profile of a person associated with the video data and the mobile communication device data. The profile may include profile data, such as the captured video data, the captured mobile communication device data, and/or other types of data associated with the person (e.g., a name, a date of birth, a residential address, and/or the like).

The profile may include captured video data, captured mobile communication device data, temporal data associated with captured video or mobile communication device data, and/or location data associated with the captured video or mobile communication device data. The captured video data may include a captured still image and/or captured video footage. The mobile communication device data may include a WiFi identifier, a media access control (MAC) identifier, a Bluetooth identifier, a cellular identifier, a near field communication identifier, and a radio frequency identifier and/or any other identifier or data associated with a mobile communication device in communication with the antenna. The temporal data may include a time at which corresponding video data is captured and/or a time at which corresponding mobile communication device data is captured. The location data may include a location at which video data is captured and/or a location at which mobile communication device data is captured.

The data analytics module 140 may be configured to add to the profile, based on correlated video data and mobile communication device data, a number of visits of the person to a premises and/or a frequency of visits of the person to the premises. The data analytics module 140 may also be configured to compare data obtained from a first source (e.g., a non-government database, a government database, and one or more previously generated profiles) to the captured video data, the captured mobile communication device data, the correlated video and mobile communication device data, and/or the profile, and identify the person based on the comparison.

The data analytics module 140 may also be configured to determine, based on the captured video and/or mobile communication device data, an arrival time and/or a departure time of the person at a particular premises or location. The data analytics module 140 may correlate the video data and the mobile communication device data based on the arrival time and/or the departure time. This time-based correlation, for instance, may enable the data analytics module 140 to associate a particular item of mobile communication device data (e.g., a Wi-Fi identifier) with a particular person captured on video.

In one example, the video camera 110 may be one of multiple video cameras 110 included in the system 100, and the video cameras 110 may be configured to capture multiple sets of video data, respectively. Likewise, the antenna 150 may be one of multiple antennae 150 included in the system, and the multiple antennae 150 may be configured to capture multiple sets of mobile communication device data, respectively. The data analytics module 140 may also be configured to correlate the multiple sets of video data and mobile communication device data to generate respective profiles for multiple people who are associated with the respective video data and mobile communication device data. The video cameras and antennae may be located at a plurality of different locations and/or premises.

In another example, the data analytics module 140 may be configured to assign a person to a positive list, an undetermined list, or a negative list based on the video data, the mobile communication device data, the profile data, and/or user-inputted criteria (e.g., inputted via the investigation module 800, described below). The data analytics module 140 may also be configured to determine that the video data, the mobile communication device data, and/or the profile corresponds to an employee or to a person on a predetermined list of people, and may assign the person to the positive list based on that determination.

In some example embodiments herein, the data analytics module 140 may be configured to detect a behavior of the person and store in the profile behavioral data corresponding to the behavior. The data analytics module 140 may, for instance, be configured to detect the behavior of the person by extracting behavioral information from the video data and/or the mobile communication device data. The behavior may include the person looking in a particular direction, reaching for an item of merchandise, purchasing the item of merchandise, traveling along a path at the premises, visiting an aisle or a location at the premises, spending an amount of time at the premises, spending an amount of time at the location at the premises, and/or visiting the premises on a number of separate instances. The data analytics module 140 may further be configured to classify the person as a new customer or a repeat customer at the premises based on premises visit data stored in the profile. The data analytics module 140 may add to the profile, or update in the profile, an indicator of whether the person is a new customer or a repeat customer at the premises. The data analytics module 140, in some cases, may be configured to detect the behavior of the person by correlating the video data, the mobile communication device data, and/or the profile data with a mapping of aisle locations at a premises, a mapping of merchandise locations at the premises, and/or a mapping of shelf locations at the premises.

In some example aspects herein, the data analytics module 140 may be configured to generate, based on captured video and/or mobile communication device data, location data corresponding to the particular behavior, and store the location data in the profile in association with the corresponding behavioral data.

Data analytics module 140 may be positioned in camera 110 to convert video-to-video data and non-video data and to provide the video data and the non-video data to the computer 120 over a network. As such, the system 100 distributes the video processing to the edge of the network thereby minimizing the amount of processing required to be performed by the computer 120.

Computer 120 includes computer-readable medium comprising software for monitoring user behavior, which software, when executed by a computer 120, causes the computer 120 to perform operations. User interface 122 provides an interface to the computer 120. User interface 122 may connect directly to the computer 120 or connect indirectly to the computer 120 through a user network. The system user interface 122 may also be configured to receive one or more criteria from a user and may enable profiles to be mined based on the criteria. In some example embodiments herein, the user interface 122 may host an investigation module 800, as described in further detail below.

A user behavior is defined by an action, an inaction, a movement, a plurality of event occurrences, a temporal event, an externally generated event, or any combination thereof. A particular user behavior is defined and provided to the computer 120.

An action may include picking up an object wherein the object has been placed or left at a particular location. An action may include moving a particular object such as the opening of a door, drawer or compartment. An action may include positioning (or repositioning) a body part such as placing a hand in a pocket or patting oneself repeatedly at a particular location (an indication that a weapon may be concealed). The action may include moving to a particular position, a first individual engaging a second individual and/or moving a hand, arm, leg and/or foot in a particular motion. An action may also include positioning a head in a particular direction, such as, for example, looking directly at security personnel or a security camera 110. Various other examples have been discussed hereinabove.

Inaction may include failing to reach for an object wherein an object is dropped or positioned and the individual (e.g., object) does not retrieve the dropped object. Inaction may also include failing to walk to a particular location or failure to perform a particular task. For example, confirming that a security door is locked would require the action of approaching the door and the action of striking the door to ensure that it would not open. As such, the user behavior may be defined as the inaction of approaching the door and/or the inaction of striking the door to confirm that the door will not open. Various other examples of inaction have been discussed hereinabove.

A temporal event may include the identification of a customer that abruptly leaves a store, an individual dwelling at a store entrance or exit, an individual remaining in a particular location for a time period exceeding a threshold. Various other examples of a temporal event have been discussed hereinabove.

A user may identify a particular user behavior and provide and/or define characteristics of the particular user behavior in the computer 120. Computer 120 receives non-video data from the camera 110 wherein the non-video data includes behavioral information data. The particular user behavior may be defined by a model 143 of the behavior where the model 143 includes one or more attribute such a size, shape, length, width, aspect ratio or any other suitable identifying or identifiable attribute (e.g., tattoo or other various examples discussed herein). The computer 120 includes a matching algorithm or matching module 141, such as a comparator, that compares the defined characteristics and/or the model 143 of the particular user behavior with user behavior in the defined non-video data. Indication of a match by the matching algorithm or module 141 generates an investigation wherein the investigation includes the video data and/or non-video data identified by the matching module 141. Investigations are a collection of data related to an identified event, and generally document behaviors of interest. As such, investigations require further review and investigation to understand the particular behavior.

The investigation may be sent to other cameras or systems on a given network or provided over a community of networks to scan for a match or identify and alert. Matching module 141 may be configured as an independent module or incorporated into the data analytics module 140 in the computer 120 or in any cameras 110. The data analytics module 140 may also include a comparator module 142 configured to compare the model 143 of the particular user behavior and the non-video data.

A particular user behavior may be defined as positioning a head toward an observation camera 110 exceeds a preset period or positioning of a head directly toward a manager's office exceeds a preset period. This particular user behavior is indicative of a customer trying to identify the observation cameras 110 in a store in an effort to prevent being detected during a theft or an employee trying to determine if a manager is observing his/her behavior. The data analytics module 140 performs an algorithm to generate non-video data that identifies the head position of objects. The video analytic module 140 may also provide a vector indicating the facial and/or eye direction. The matching module 141 searches the non-video data to determine if the head position and/or vector indicating facial direction exceeds the preset period. A match results in the generation of an investigation.

Figure 2:
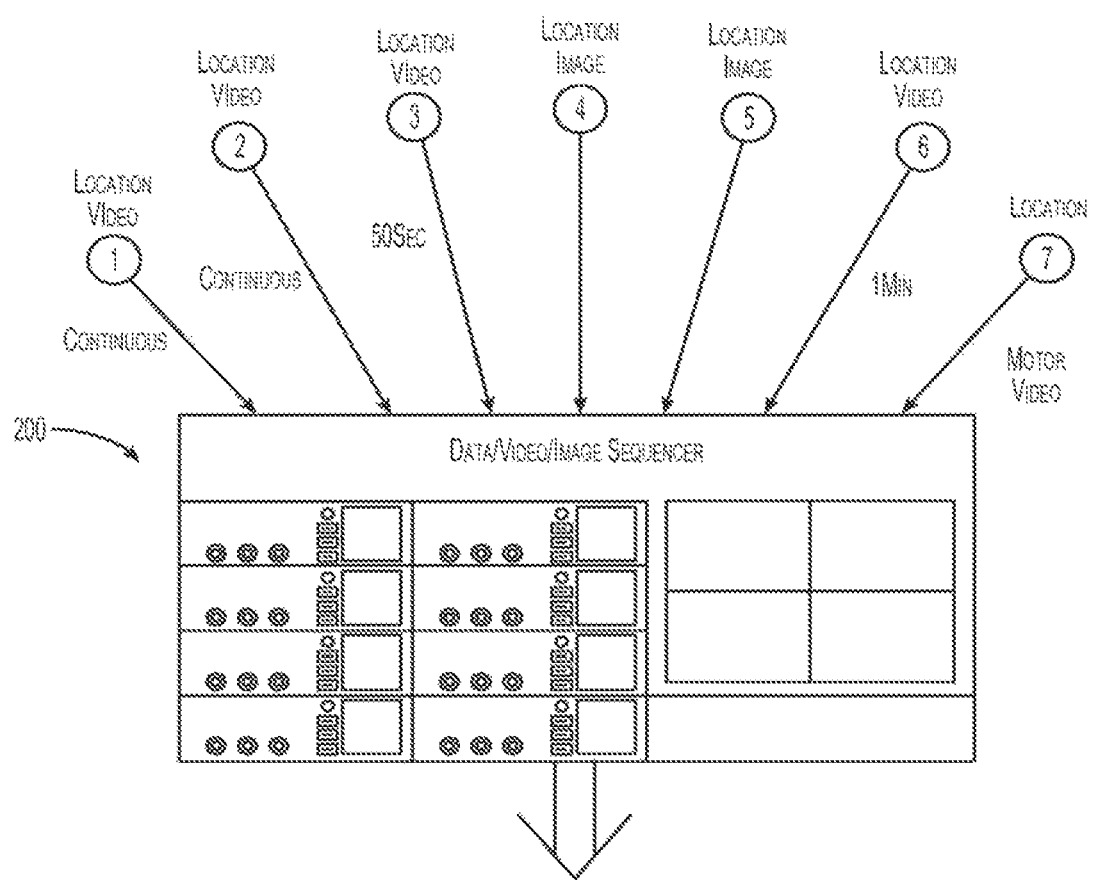
FIG. 2 is a data/video/image sequencer according to an embodiment of the present disclosure.

With reference to FIG. 2, a data/video/image sequencer according to an embodiment of this disclosure is shown as a sequencer system 200. System 200 is configured to receive video, video data, non-video data, video sequences, still images, and/or mobile communication device data from various sources of video (e.g., various of the one or more video cameras 110) and/or from various of the one or more antennae 150. For example, continuous video may be provided from locations 1 and 2, while motion only data may be provided from location 7. Video clips of short duration may be provided from locations 3 and 6 and still images may be provided from locations 4 and 5. Mobile communication device data may be provided from locations 1 through 7. This data may be communicated to the system 200 by any suitable communications medium (e.g., LAN, WAN, Intranet, Internet, hardwire, modem connection, wireless, etc.). As shown in FIG. 2, data from each location may be communicated in any suitable manner, such as for instance, continuously, periodically at a predetermined rate, asynchronously, in response to receipt of a trigger, and the like.

System 200 generates a time-stamp from data provided with the video data, image data, and/or mobile communication device data. The time-stamp may be embedded into the video data, image data, and/or mobile communication device data, provided as part of the video data, image data, and/or mobile communication device data, or a time-stamp may be provided with the file containing the video data, image data, and/or mobile communication device data. Alternatively, system 200 may be configured to receive user-entered data, included time-stamp information, associated with each input.

System 200 may additionally, or alternatively, generate a geo-location from the data provided with the video data, image data, and/or mobile communication device data. Geo-location information may be embedded into the video data, image data, and/or mobile communication device data, provided as part of the video data, image data, and/or mobile communication device data, or provided with the file containing the video data, image data, and/or mobile communication device data. For example, video, image, and/or mobile communication device data may contain a landmarking feature that may be used to identify the location where the picture was taken.

System 200 may additionally, or alternatively, generate field-of-view data (hereinafter "FOV data") for video data and/or image data. FOV data may be obtained from the camera location information, obtained from the information contained within the video (e.g., landmark identification) and/or entered by a user. System 200 may additionally, or alternatively, generate antenna range data for mobile communication device data. Antenna range data may be obtained from location information of the antenna 150, obtained from information contained within the mobile communication device data, and/or entered by a user.

Figure 3:
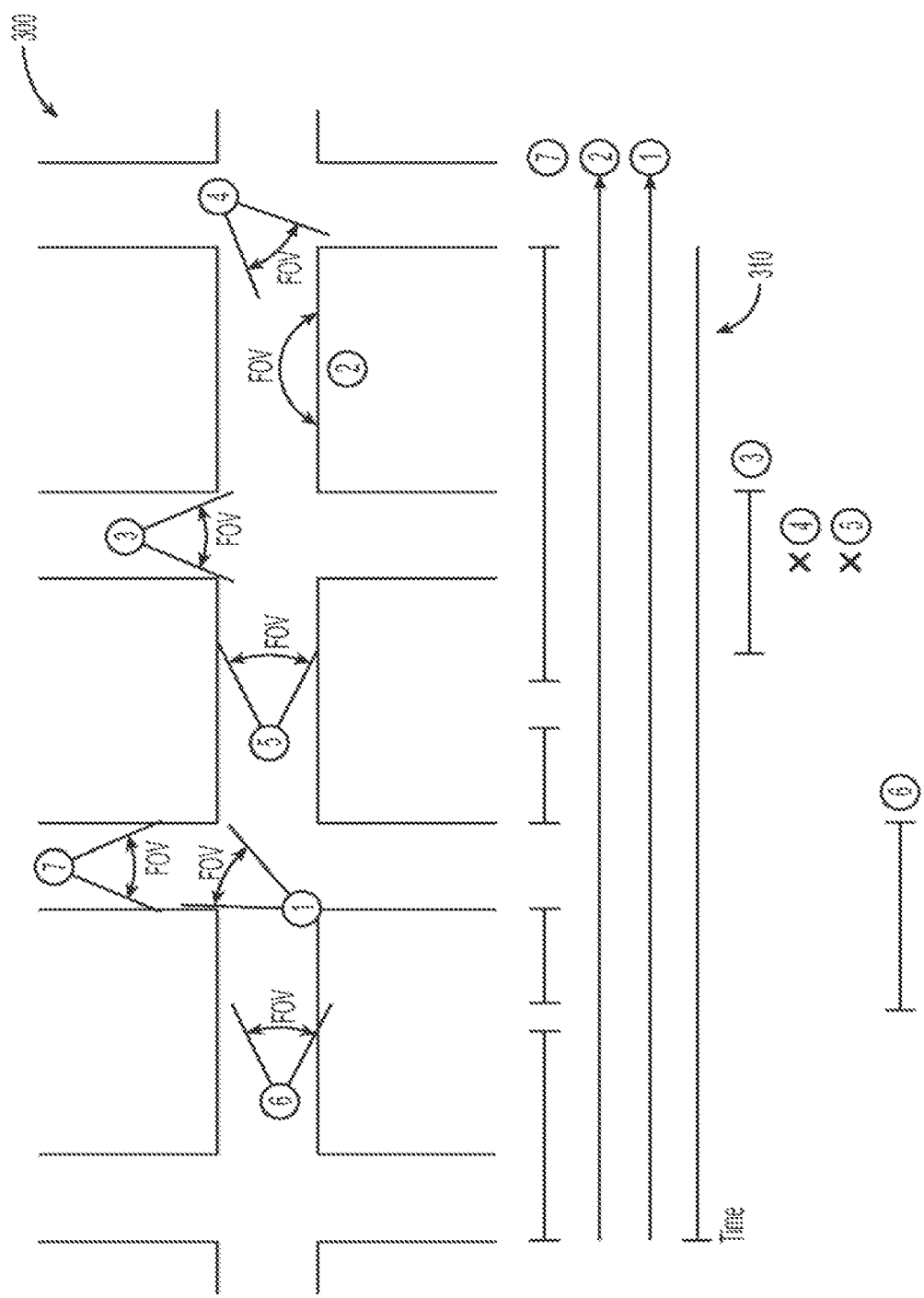
FIG. 3 is an illustration of an image map and an associated timeline generated by the sequencer of FIG. 2.

FIG. 3 is an illustration of an image map 300 and an associated timeline 310 generated by the system 200. System 200 may be configured to utilize the time-stamp data, geo-location data, FOV data, and/or antenna range data to assemble an image map 300 and timeline 310 from all video data, image data, and/or mobile communication device data (or any portions thereof) provided to the system 200.

A user may provide the system 200 with a particular time and/or timeframe and the system 200 provides all video, images, and/or mobile communication device data related to that particular time. Time and/or timeframe may be selected on the timeline 310 and the image map 300 may be updated to include all video data, image data, and/or mobile communication device data related to the selected time and/or timeframe.

A user may additionally, or alternatively, provide the system 200 with a selected location and the sequencer provides all video data, image data, and/or mobile communication device data related to that particular location. Selected locations may be selected on the image map 300 or provided as geo-location data to the system 200.

A user may additionally, or alternatively, provide the system 200 with a particular time and/or timeframe in addition to a geo-location to further narrow and isolate all video data, image data, and/or mobile communication device data related to that particular location.

After a particular time, timeframe and/or geo-location is used to identify video data, image data, and/or mobile communication device data, the user may utilize the searching algorithms, methods and system described herein to identify particular items of interest, patterns and/or individuals contained within the video data, image data, and/or mobile communication device data.

The present disclosure goes beyond facial recognition software (which may be utilized in conjunction herewith) and provides additional algorithms and analytics for tracking and/or investigative purposes as explained below. In addition, it is not necessary in certain instances that facial recognition be utilized to flag or track someone or something and the presently-described system may be employed without facial recognition software or algorithms which may prove insensitive to certain moral, federal or local laws.

The present disclosure also relates to an analytical recognition system for real time/post time object tracking based on pre-programmed parameters, e.g., real time and post time analysis, recognition, tracking of various pre-programmed (or post programmed) known objects or manually programmed objects based on shape, color, size, number of certain objects on a person(s), oddity for a particular circumstance (e.g., winter coat in 80° heat), similarity of particular object over the course of a particular time frame (similar items, e.g., backpacks, within particular area), separation of a sensitive object(s) from person for a preset period of time, odd object in particular area, objects placed near sensitive objects, similar objects being placed in similar areas and separated from person, particular color contrasts and combinations (e.g., red shirt exposed under black shirt, or white hat on black hair).

Figure 4:
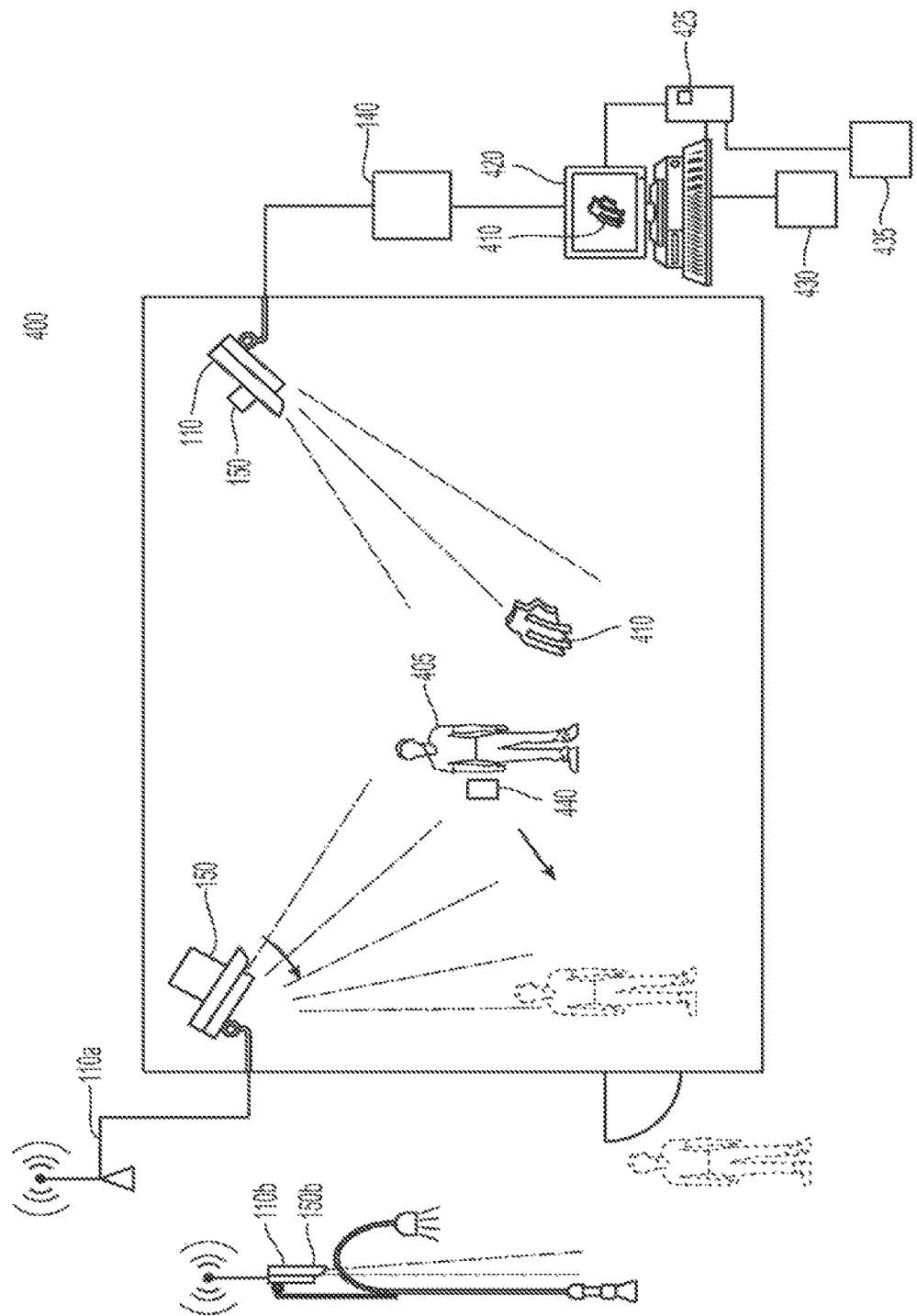
FIG. 4 is a schematic illustration of an analytical recognition system used for object identification and tracking according to another embodiment of the present disclosure.

Programmed objects may include objects with a particular known shape, size color or weight (as determined by number of people carrying, gait of person carrying, how the object is being carried, etc.) or based upon a look up library of objects and mapping algorithm. These objects may be pre-programmed into the analytical software and tracked in real time and/or post time for analysis. Manually programmed objects may be inputted into the software by color, size, shape, weight, etc. and analyzed and tracked in real time and/or post time to determine abnormal conditions or for other purposes. Manually programmed objects may be uploaded for analysis in real time, e.g., facial recognition images, tattoos, piercings, logos, or other indicia as explained in more detail below. Additionally, a user generated item and/or image may be generated from video data (e.g., frame data) and/or a still image and provided for analytics. For example and as shown in the an analytical recognition system 400 of FIG. 4, an object 410 (e.g., hat, backpack, outfit, or any identifiable feature) identified in a still image and/or a video frame (or identified as a result of one of the abnormal conditions described herein) may be isolated from the person 405 for a preset amount of time (temporal event) and provided as a user generated item 410' for identification in live-video 420 or searched and identified in stored video 425, e.g., video frames and/or still images.

The person 405 may possess a mobile communication device 440 (e.g., a smartphone) equipped with one or more antennae (not shown in FIG. 4) by which one or more signals (e.g., mobile communication device data) are wirelessly transmitted. Examples of such mobile communication device data include signals (e.g., handshaking signals) that the mobile communication device 440 transmits in accordance with one or more wireless communication protocols, such as a WiFi communication protocol, a media access control (MAC)-based communication protocol, a Bluetooth protocol, a cellular protocol, a near field communication protocol, and a radio frequency identification protocol. As discussed above, the one or more antennae 150 are configured to capture the mobile communication device data transmitted by the mobile communication device when it is located within a range of the one or more antennae 150 and transmit the captured mobile communication device data to the data analytics module 140 for processing in accordance with various example embodiments herein.

System 400 may include data analytics module 140 that is configured to perform real time and/or post time analysis of video and non-video data (e.g., mobile communication device data) and tracking of every person with a object 410 within a particular area or within a particular camera view. Suspicious behavior and/or behavior of interest of one or more persons may be tracked and recorded and analyzed in either real time or post time. For example as identified in FIG. 4, if the object 410 is separated from a person 405 and left for a predetermined period of time, this video may be flagged for real time alerts and/or post time analysis. The object, e.g., object 410, might be flagged, time stamped and/or separated into an individual video stream for analysis later. A user in real time or post time analysis can zoom in for high-definition tracking or for incorporation into a data/video/image system 200 as discussed herein. The person 405 dropping a preprogrammed suspicious object, e.g., object 410 (or any other object that is recognized by a library of images 430, user generated image/object 435 (via an input device) or a certain mapping algorithm or module 140) may be tracked and analyzed for real time alerts and/or post time analysis. The system 400 may both track the object 410 and flag and track the person 405 for real time or post time analysis through one or more cameras 110, a network of cameras 110, 110a, 110b, one or more antennae 150, and/or a network of antennae 150, etc.

In another example, the system 400 may flag and track in real time for alert purposes or post time analysis a person wearing a winter coat in the summer, a long raincoat when sunny, etc. This would also be classified as an alert or abnormal condition.

The system 400 may be capable of combining pre-programmed analytics to alert for one or more (or a combination of) abnormal scenarios. For example, a person carrying a case capable of carrying an semi-automatic or automatic rifle and that person loitering outside of a sensitive building for a pre-determined period of time may be automatically flagged, tracked and an alert sent to security.

The system 400 may be capable of tracking and analyzing particular objects and the software or data analytics module 140 may be pre-programmed to identify the same objects in later obtained video streams and/or still images. For example, a person of particular importance is scheduled to have a press briefing or scheduled to arrive at a particular location at a specific time. The scheduled event is postponed (intentionally or unintentionally). The software or data analytics module 140 may be preprogrammed to recognize certain objects (or persons with objects 410 or user generated objects 435) appearing in newly generated video for the re-scheduled event. In certain instances, the original video from the original time of the scheduled event may be reviewed and a user may pre-program the software or data analytics module 140 to look for certain "repeat" objects 410 (backpacks, coats, hats, clothing, briefcases, persons, etc.) in the real time video footage of the now re-scheduled event. A person may also be classified as a loiterer and flagged for review at the later scheduled event. A warning can be sent to the security team reviewing the tapes in real time if that was a person of interest.

Figure 5:
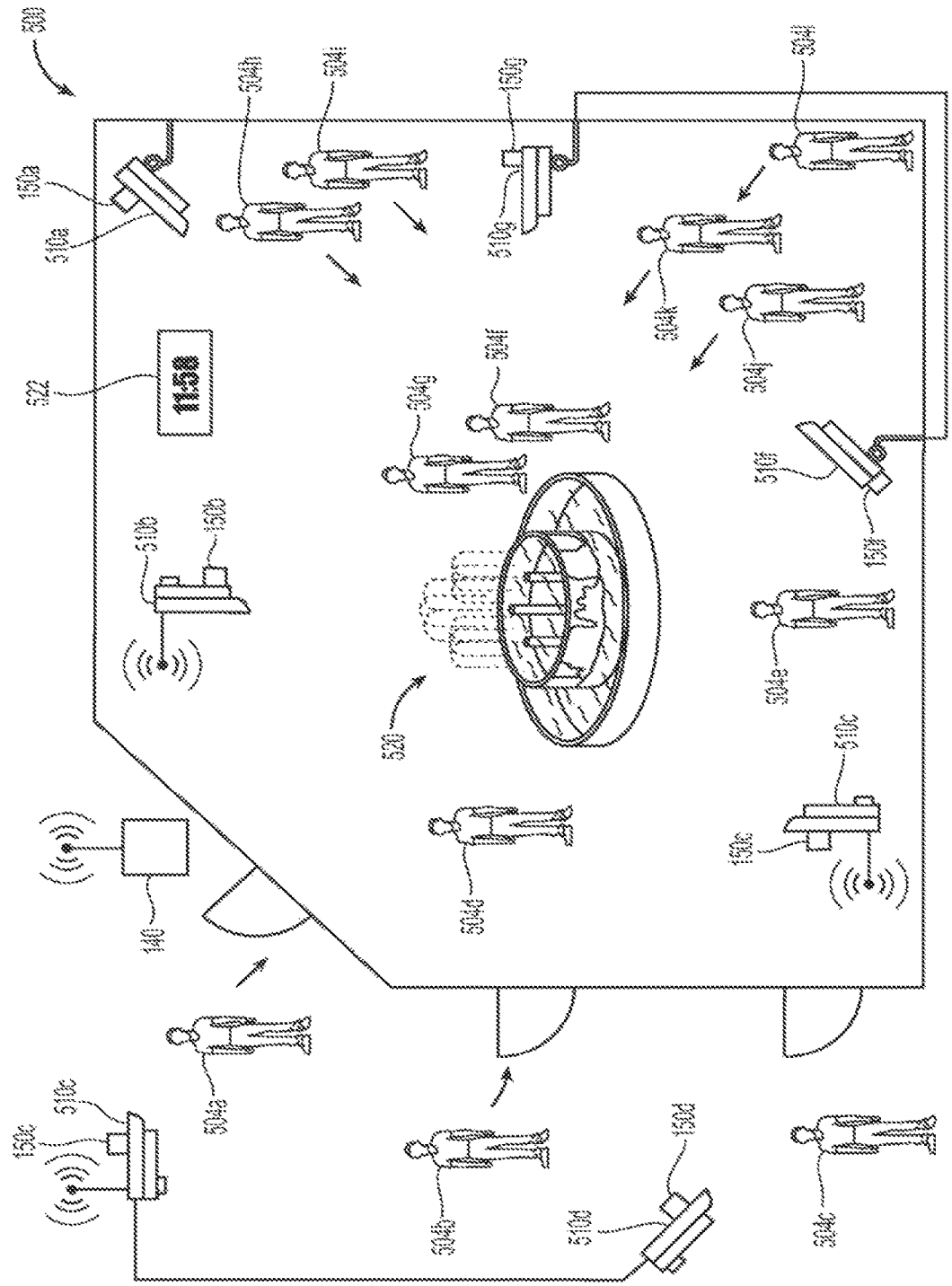
FIG. 5 is a schematic illustration of an analytical recognition system used for convergence tracking according to another embodiment of the present disclosure.

The data analytics module 140 may be configured to recognize abnormal patterns of behavior or unexpected patterns of behavior and alert security or investigators of potentially abnormal scenarios, events or conditions. The video and/or data may be configured for real-time analytics or post event analysis. For example, the data analytics module 140 can be programmed to recognize convergence patterns toward a particular geographical area and/or divergence patterns away from a particular geographical area. Global positioning software and vectoring may be utilized to accomplish this purpose. Recognition of convergent patterns and/or divergent patterns may be helpful in automatically recognizing potential flash mobs, mass robberies or other abnormal events. For example and as shown in FIG. 5, analytical recognition system 500 includes data analytics module 140 which may be configured to track an abnormal number of patrons 504a-504l arriving at a particular location 520 at or near a particular time 522. The data analytics module 140 may also be configured to track abnormal velocity of patrons 504a-504l and/or individuals arriving or departing from a particular location 520. A typical arrival and/or departure velocity may be preset or obtained from an algorithm of previous individuals that may have arrived or departed from a particular location over a preset or variable amount of time. Deviation from the arrival and/or departure velocity may trigger an abnormal condition.

Although not explicitly shown in FIG. 5, one or more of the people 504 may possess one or more corresponding mobile communication devices 440 (e.g., smartphones) equipped with one or more antennae by which one or more signals (e.g., mobile communication device data) are wirelessly transmitted. As discussed above, the one or more antennae 150 are configured to capture the mobile communication device data transmitted by the mobile communication devices 440 when they are located within the respective ranges of the one or more antennae 150 and transmit the captured mobile communication device data to the data analytics module 140 for processing in accordance with various example embodiments herein.

A security system 500 with the data analytics module 140 and one or more cameras 510a-510g may be configured to recognize an abnormal number of people converging towards a particular geographical area 520 over a preset time. The data analytics module 140 may be configured to utilize vector analysis and/or image and data vector analysis algorithms and/or machine learning algorithms to assess one or more convergence patterns. Moreover, the system 500 may be configured to recognize similarities in clothing, age, articles being carried (e.g., briefcases, backpacks, other similar items) and alert security or investigators of a possible abnormal condition. This can be useful in recognizing so-called "flash mobs" or other highly sensitive situations during a parade, marathon, political speech, etc.

Divergence patterns and/or velocities may be used to identify unusual patterns of individuals departing from a particular area 520. For example, in the event of a panic-like situation the divergence velocity of individuals is expected to be greater than a preset or calculated average divergence velocity. As such, identification of one or more individuals leaving the particular area and/or situation at a velocity less than the average velocity or the panic-like velocity may indicate that the individual was not in a panic-like condition possibly due to the fact that he/she perpetrated or were aware of the particular panic-like situation. Moreover a person leaving an area with a higher than average velocity may be "running from an event", e.g., running from a robbery or away from an upcoming explosion.

The data analytics module 140 may also be configured to monitor web traffic and/or social media sites (Facebook®, MySpace®, LinkedIn®) relating to a particular location and/or event and provide alerts of that nature to security or combine web traffic relating to an event or geographic area with video analytics that recognize convergence patterns to alert of a potential flash mob or gang robbery. The data analytics module 140 may also work in reverse and access web traffic or various social media sites when a convergence pattern is recognized and ping one or more of these sites to gather additional information to possibly uncover more pattern activity or uncover a flash mob event at a particular location.

The data analytics module 140 may also be configured to monitor web traffic or social media sites for activities that precede a particular time stamp. For example, a social media posting conveys condolences for a particular event that coincides or precedes the particular event may indicate foreshadowing of the event and indicate prior knowledge of the upcoming event.

The system 500 and data analytics module 140 may be configured to analyze video and/or mobile communication device data from one or more street cameras, parking lot cameras, store/mall camera, or other cameras 510*a*-510*g* to determine pre-programmed abnormal conditions or manually programmed conditions in real time. The system 500 may be configured to provide an alert if an abnormal number of cars are converging at a particular spot (e.g., shopping mall), and couple that information with footage from the parking lot surveillance cameras to ascertain how many people are converging on a particular store or place and couple that analytic with the in-store camera to determine loitering at a particular spot at a particular time or delta time. This is typical behavior of a flash mob or gang robbery. Again, the system 500 might tie into one or more social media sites for additional information and/or confirmation.

Similarly, the velocity patterns of the approaching cars, obtained from video and/or mobile communication device data, and/or the velocity at which individuals depart from their cars may also be indicative of abnormal condition.

Other examples of analytics that the data analytics module 140 may perform in real time and/or post time may relate to gang-type recognition. For example, the analytical recognition system 600 of FIG. 6 may be configured to recognize gang colors and/or color combinations and/or patterns and flag the video 618 and/or alert security if an abnormal number of individuals (or abnormal % of individuals) with particular colors or color combinations and/or patterns are converging on, or loitering in, a particular geographical area. The data analytics module 140 may be pre-programmed to recognize a particular characteristic or trait 615 of an individual or individuals 605*a*, e.g., clothing, head gear, pant style, shirt/coat colors, the manner it is worn, symbols, coat logos, tattoos, piercings, hair style, hand gestures, cars, motorbikes, etc. and alert security of an abnormal condition or a previous investigation stored as a previous image 625 in a computer 620. Alternatively, and/or additionally, the data analytics module 140 may be pre-programmed to recognize mobile communication device data (e.g., a cellular identifier) of a mobile communication device 440*a* of an individual 605*a*, and alert security of the presence of the individual 605*a* who may be a known person of interest. These individuals 605*a* may be flagged and tracked for a preset period of time or until he/she leaves the area. The overall image and traits 615 of a particular group of patrons in a crowd (similarities of colors, uniform, gear, clothing style, hair style, logos, piercings, tattoos, symbols, other gang-related indicia, cars, motorbikes or clothing, etc.) may be recognized and trigger an alert. The data analytics module 140 may provide an alert that x % of individuals in a particular crowd have a particular trait 615, e.g., same tattoo, red shirts on, have the same logo, hair style are carrying a specific object, etc. The data analytics module 140 may be configured to provide an alert based on an assessment that a predetermined number of individuals in a particular crowd have a particular trait 615.

The data analytics module 140 may be configured to provide graphical representations of numerous abnormal conditions to better facilitate recognition of patterns or very high levels (and/or predetermined levels) of one or more abnormal conditions. This may allow a higher number of patterns to be tracked and analyzed by one or more individuals. The data analytics module 140 may also recognize contact between individuals wherein the contact may be physical contact (e.g., handshake, an embrace or exchange of an object) or contact may be non-contact (e.g., engage in conversation, prolonged eye-contact or engaging in other non-physical contact that would indicate acknowledgement therebetween).

Figure 6:
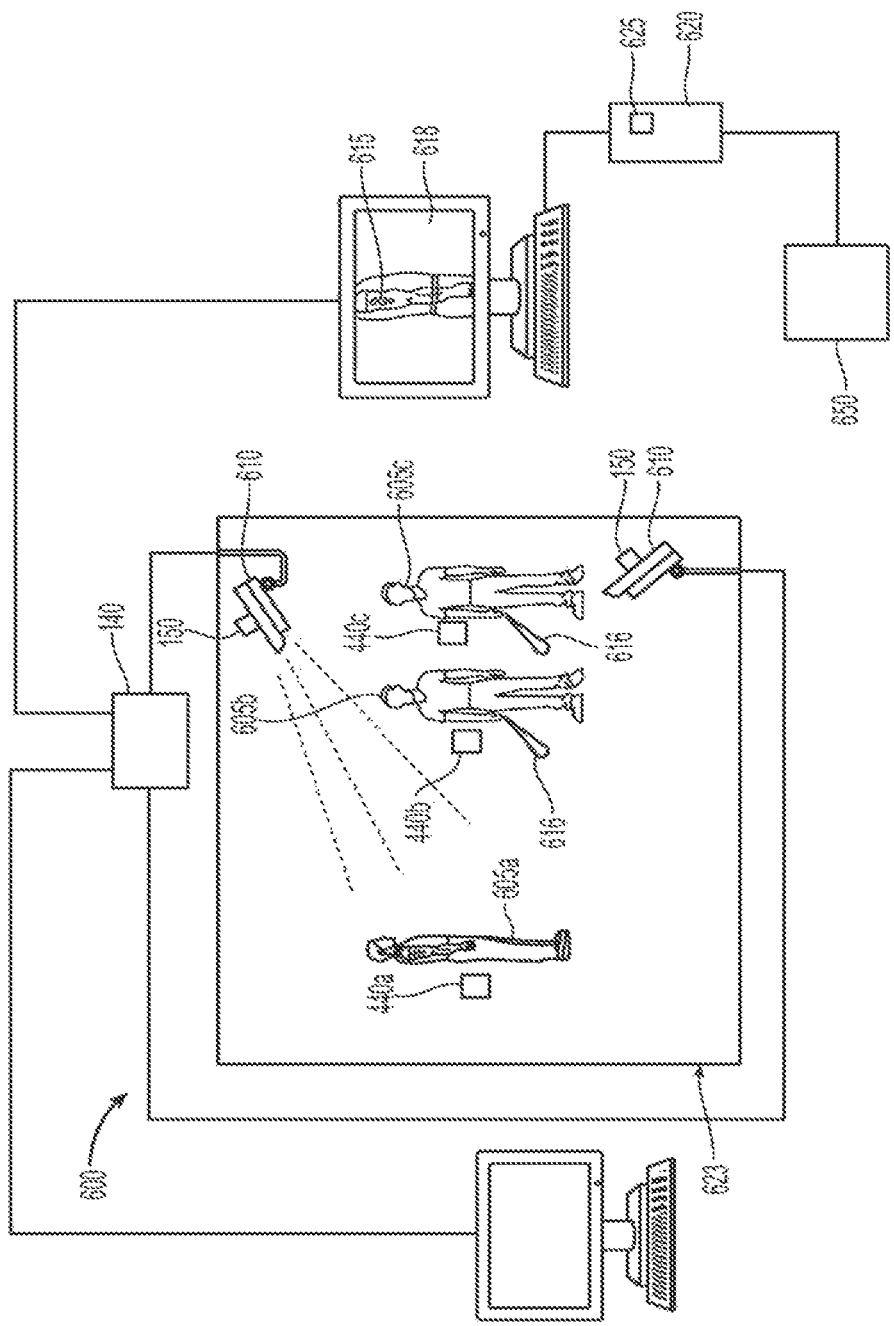
FIG. 6 is a schematic illustration of an analytical recognition system used for character trait recognition according to another embodiment of the present disclosure.

Other alert-type conditions may relate to abnormal scenarios wherein the data analytics module 140 recognizes an object being carried by an individual 605*b* that is unusual for a particular area. For example as shown in FIG. 6, a person carrying a pitchfork or shovel (not shown) in a mall 623, or a group (individuals 605*b* and 605*c*) carrying bats 616 in mall 623 and converging on a particular area. Again, real-time analysis of the video would be most useful and provide security with an abnormal condition alert. Post analysis may be helpful for determining offenders should an event take place when authorities are called to assist.

With any of the aforedescribed scenarios or alerts noted herein, the data analytics module 140 may work in conjunction with a video library of images 650 and/or with one or more databases of aggregated mobile communication device data to trigger alerts or respond to queries. Additional images, such as a library images and/or user-generated images 650, may be provided as inputs to the data analytics module 140 and used to analyze video through the recognition aspects of the data analytics module 140. This may all happen in real time or during post time analysis. Again, queries may be entered depending upon a particular purpose and the system 100, 200, 300, 400, 500 and/or 600 can in real time or post time analyze video for the queried conditions.

The system 100, 200, 300, 400, 500 and/or 600 may be configured to perform three-dimensional face recognition. The system 100, 200, 300, 400, 500 and/or 600 may be manually programmed to recognize an individual or suspect 605a in an investigation (or prior felon) based on clothing type, piercings, tattoos, hair style, etc. (other than facial recognition which may also be utilized depending on authority of the organization (FBI versus local mall security)). An image of a suspect 705a may be scanned into the data analytics module 140 and items such as piercings, tattoos, hairstyle, logos, and headgear may be flagged and uploaded into the image database for analyzing later in real time or post time analysis. For example, if the individual 605a robs a convenient store and his/her facial image is captured onto one or more cameras 610, not only may his/her image be uploaded to all the cameras 610, but other identifying information or characteristics or traits 615 as well, e.g., hair style, tattoos, piercings, jewelry, clothing logos, etc. If the thief 605a enters the store again, an alert will automatically be sent to security. Even if the system recognizes a similar trait 615 on a different person that person may be deemed a suspect for questioning by authorities. Again, this goes beyond mere facial recognition wherein that so-called different person would not necessarily be flagged and tracked.

The system 100, 200, 300, 400, 500 and/or 600 may also generate a library of individuals and/or patrons that regularly frequent or visit a particular location thereby eliminating the need to track these particular individuals and allowing the system 100, 200, 300, 400, 500 and/or 600 to focus on identification and tracking of individuals not previously identified and saved in the library. The library of patrons (not shown) may also link to a Point-of-Sale (POS) system thereby validating that the individuals identified and stored in the library are regular patrons.

Figure 7:
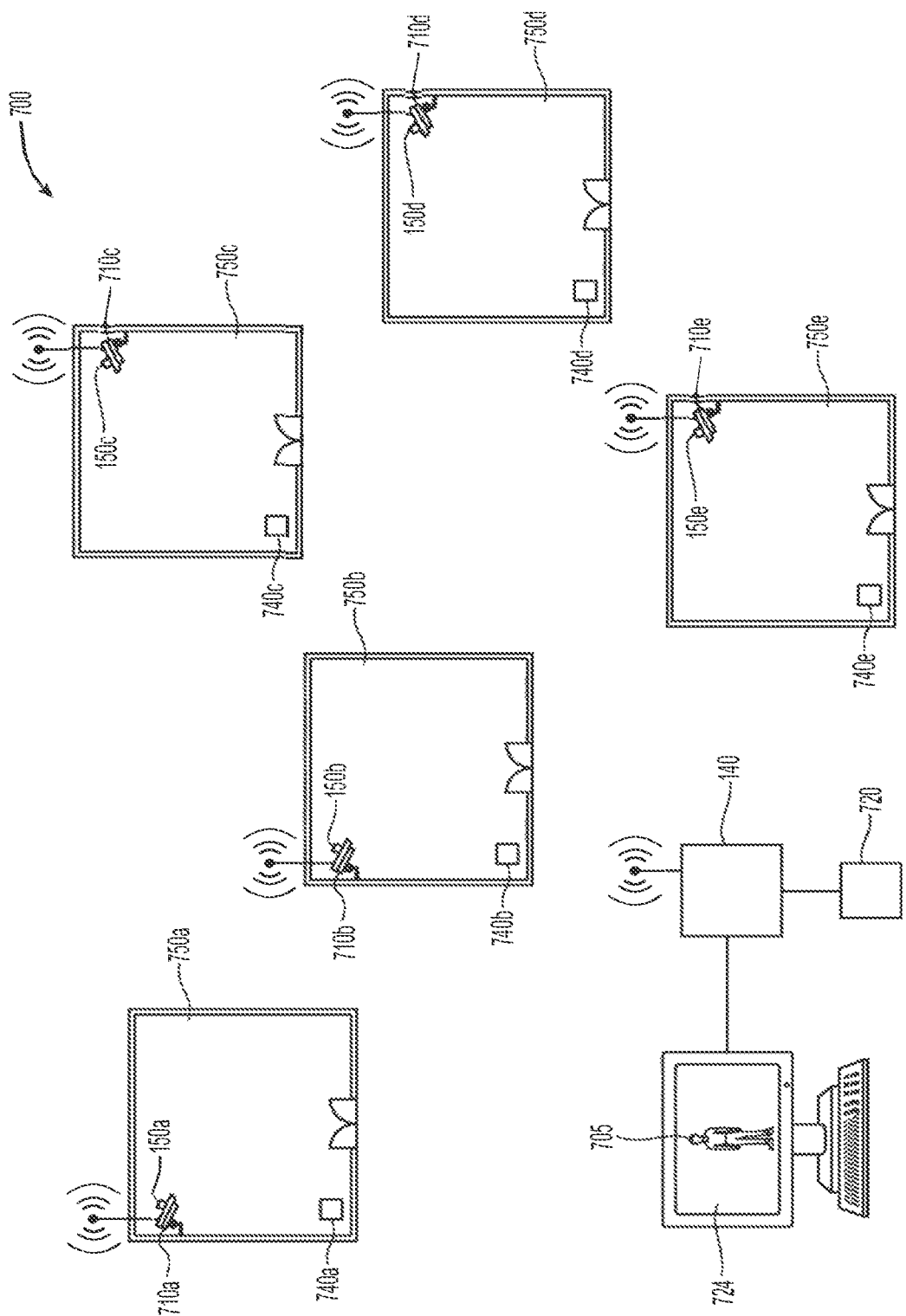
FIG. 7 is a schematic illustration of an analytical recognition system used for a community surveillance network according to another embodiment of the present disclosure.

As best shown in FIG. 7, another analytical recognition system 700 is shown with the data analytics module 140 being utilized with a chain of stores, a mall or a series of stores 750 in a town or community. The community of stores or a chain of stores 750a-750e is able to share video images 724, mobile communication device data, and/or other identifying information of characteristic or trait of known individuals (e.g., felons) 705 across a network of cameras 710a-710e utilizing the same the data analytics module 140 (or uploading the image 724 and identifying information on an individual store analytical system 740a-740e). These local stores 750a-750e may be able to prevent additional losses by flagging and tracking known individuals 705 of particular interest (based on a prior characteristics or traits as described above and/or identifying information entered into an image and/or information database) once individual 705 enters a store, e.g., store 750a. Alerts may be sent to local authorities of these individuals (or group of individuals) and they may be tracked throughout an entire network of cameras 710a-710e, including parking lot cameras, street cameras, etc. along a community network. Once an individual 705 is flagged and there is an alert, other information may be captured relating to car, car type, car route, accomplices, etc. Further, all cameras 710a-710e and/or antennae 150a-150e in the system 700 may be alerted to flag and track the individual 705 and accomplice in real time and/or for post time analysis.

The various described systems 100, 200, 400, 500, 600, 700 and 800 may also be utilized to identify individuals with a "no contact" condition. For example, a building resident may have a restraining order issued by a court that prevents a particular individual from being within a certain proximity. The image, e.g., 724, may be entered into the system e.g., system 700 and the data analytics module 140 may identify the individual 705 and provide notice and/or documentation to the building resident and/or the authorities. Similarly, a government-generated database 720 may be provided to the system 700 wherein the database 720 includes a library of images 724 of individuals 705 identified in a particular legally mandated registration program.

A community may choose to set up a community network of cameras 710a-710e for this purpose. New owners of local businesses may opt to upload a particular felon's image 724 for analyzing (i.e., for local alerts) on a per occurrence subscription (e.g., dollar amount), e.g., a particularly violent felon's image 724 and additional identifying information may be of particular interest to an entire community for uploading on all networked cameras 710a-710e (or even standalone systems) while a small time shoplifter may not be of interest.

The data analytics module 140 may also utilize gait as an indicator of an individual or suspect, limp, shuffle, head angle, stride, hand sway, hand gestures, etc. A person's gait is as individual as a fingerprint and may be used to identify disguised felons. Many variables contribute to an individual gait and this information can be uploaded to the data analytics module 140 (e.g., walk velocity, step frequency, angle between feet, hand/arm position, hand/arm sway, limp, shuffle, etc.)

The data analytics module 140 may also be configured to alert security if a certain number of known images or events or habits occurs within a particular time period (e.g., self patting of particular area(s) X number of times within preset time period, patting or clenching of a known area for carrying or hiding weapons, nervous twitching or rapid head turning X number of times, leering around corners, looking at video cameras X number of times within a preset time period, etc. The data analytics module 140 may be configured to alert security or provide information to a user based on an abnormal or excessive habit or event occurring within a preset time limit or a combination of any of the events occurring within a preset time period. For example, a person walking through a store with hand clenched atop pants with rapid head turning may trigger an alert or abnormal situation. In another example, security is flagged or highlighted (or otherwise identified in a certain area(s) by the system 100, 200, 300, 400, 500, 600, 700 and/or 800) and a suspect leering in that direction repeatedly or repeatedly turning his/her head in that direction may trigger an alert or abnormal situation. In another example, an individual shopping and/or lingering in an area of a store that is typically an area with short dwell times (e.g., dwell time for a male in the make-up area is typically short while dwell-time for a female is typically, if not always, long).

As mentioned above, the analytical recognition system 100, 200, 300, 400, 500, 600, 700 and/or 800 of the present disclosure may be utilized to determine gun or weapon detection by virtue of pre-programming certain habitual behavior into the data analytics module 140 and analyzing the same (in real time and/or post time). For example, a person repeatedly grabbing a certain area known to house weapons and walking with a certain gait (e.g., walking with a limp might indicate carrying a shotgun) may be an indication of the person carrying a weapon. This information may be analyzed with other identifying information or indicia (e.g., tattoo, gang color, gang symbol, logo, etc.) to trigger an alert or abnormal situation. In another example, an individual is wearing a trench coat when it is not raining or on a sunny day in the Summer and leering or head turning. In this instance, the data analytics module 140 would need some sort of sensory input regarding rain or temperature or sunshine (light) and/or a connection to a system that provides such data. The time of day might also become a trigger or additional event that is preprogrammed into the data analytics module 140 analytics to heighten "awareness" of the data analytics module 140 when triggering alerts, e.g., very late at night or past midnight when more robberies tend to occur.

In other examples, the data analytics module 140 may allow the security personal to query the analytical recognition system 100, 200, 300, 400, 500, 600, 700 and/or 800 in real time or post time: "How many people with red baseball caps have entered the store or area within the delta of 5-10 minutes?"; "How many people are converging on the central fountain at this time or over this delta time?"; "How many people have lingered at the fountain for delta minutes?" Other queries may include instructions: "Scan and recognize/flag/follow/track people wearing long pants or winter coats (when 90° degree Summer day)"; "Scan and recognize/flag/follow/track people wearing red hats"; "Scan and recognize/flag/follow/track people carrying multiple backpacks"; "Scan and recognize/flag/follow/track people who have left objects (e.g., backpacks unattended)—track person over system, multiple systems, flag location of object, etc."; "Scan and recognize/flag/follow/track people loitering near sensitive areas, leaving objects near sensitive areas—track person over system, multiple systems, flag location; and/or "Alert if a delta number of unattended objects left at preset time or over preset time".

In another example, the data analytics module 140 may be configured to perform real-time video processing and analysis to determine a crowd parameter (e.g., a real-time crowd count or a real-time crowd density estimation) by automated processing of the video sequence of a physical space. The video analytic module 140 may include one or more algorithms configured to determine a rate of change in the crowd parameter. The rate of change in the crowd parameter may be indicative of crowd convergence or crowd divergence.

When the rate of change in the crowd parameter exceeds a predetermined threshold, the data analytics module 140 automatically issues an alert. For example, when the rate of change in the crowd parameter is indicative of crowd convergence, the data analytics module 140 may alert security of a potential flash mob or gang robbery. The data analytics module 140 may be configured to utilize vector analysis and/or image and data vector analysis algorithms and/or machine learning algorithms to assess one or more convergence patterns.

The data analytics module 140 may be connected to an array of cameras 510a-510g organized in a network, and upon issuance of an alert each camera in the network may be utilized to track one or more objects or individuals (e.g., patrons 504a-504l shown in FIG. 5). When the rate of change in the crowd parameter is indicative of crowd divergence, the data analytics module 140 may alert security of a potentially hazardous situation or criminal activity.

Figure 8:
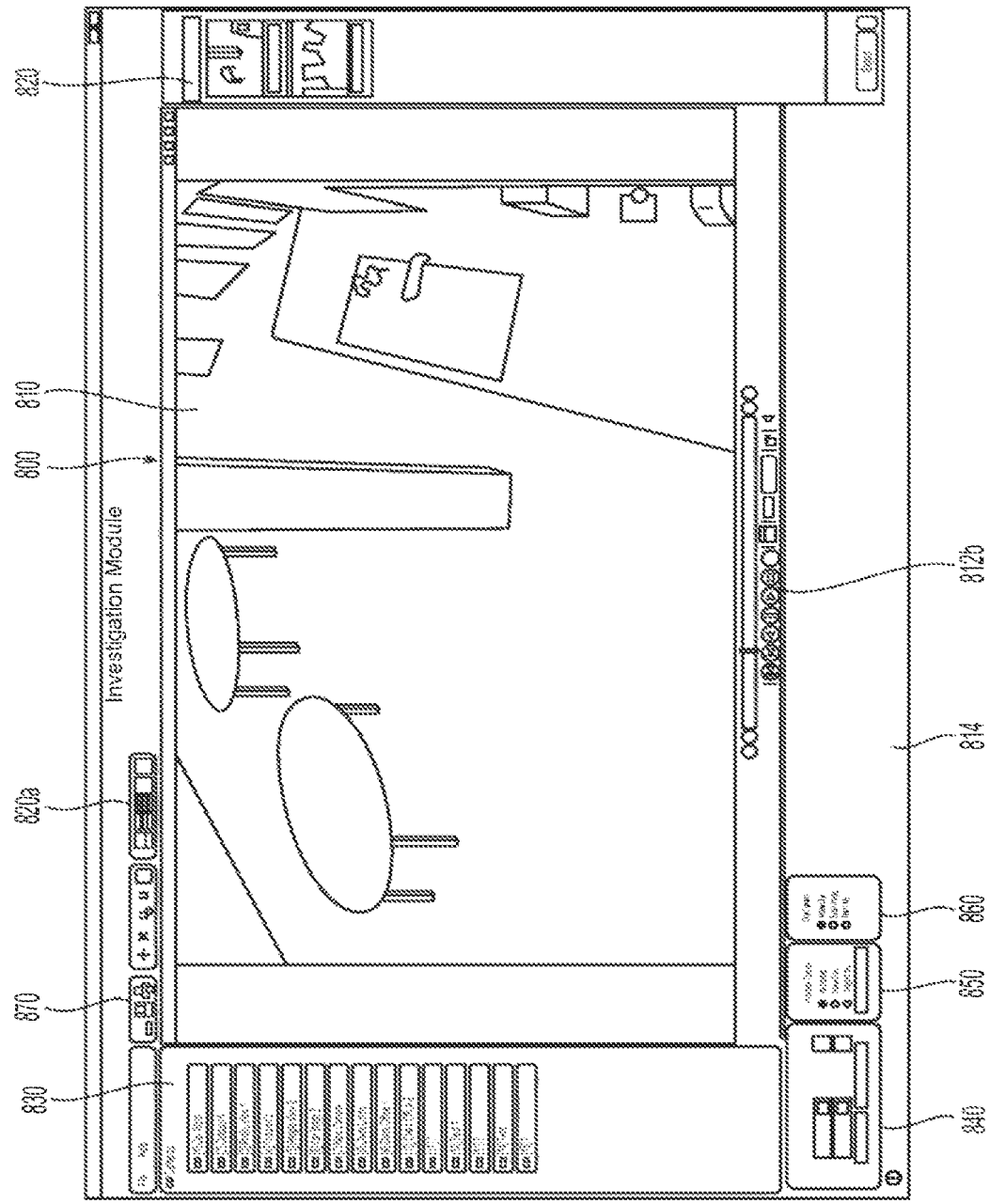
FIG. 8 is a screen-shot of an embodiment of an investigation module displaying an investigation in accordance with the present disclosure.

FIG. 8 is a screen-shot of the investigation module 800 displaying an investigation generated in accordance of an embodiment of this disclosure. Investigation module 800 is configured to generate and store information required to document a particular user behavior.

Additionally, the investigation module 800 may be configured to receive investigation criteria inputted by a user or a machine, and mine video data, mobile communication device data, and/or profile data based on the criteria. In one example, the investigation criteria may include a time frame, and the investigation module 800 may be configured to generate a list of people whose presence was detected on a premises during that time frame. The investigation module 800 may also be configured to determine a current location of a person by detecting a signal that matches a mobile communication device data previously obtained at another location.

In some example embodiments herein, the investigation module 800 is configured to receive report criteria inputted by a user requesting a particular type of report; mine video data, mobile communication device data, and/or profile data obtained from video cameras 110 and/or antennae 150, and/or sales data (e.g., obtained from a sales database); and generate a report based on the mining of the data. The report may include, for instance, a computed sales close rate corresponding to an item of merchandise, a merchandise category, an aisle at the premises, a shelf at the premises, and/or a predetermined location at the premises.

Investigation module 800 includes a viewing window 810 with upper and lower viewing control bars 812a, 812b, a text entry window 814, a timeline window 820, a camera window 830, a search window 840, a playback option window 850, a clip option window 860 and a file maintenance window 870.

Investigations automatically generated by the system 100 are populated with information related to the particular user behavior as discussed hereinabove. For example, the investigation illustrated in FIG. 8 includes a first video sequence 820a and a second video sequence 820b wherein the first video sequence 820a is from the downstairs camera and the second video sequence 820b is from a camera located at the elevator. In one embodiment, the first video sequence 820a was provided through an automatically generated investigation and the automatically generated investigation was provided to the loss prevention individual.

The first video sequence 820a is selected in the timeline window 820 and played in the viewing window 810. To further this explanation and for example, suppose the loss prevention individual, upon viewing the first video sequence 820a on a PDA, observes an individual removing a company laptop computer from the downstairs area. In generating the investigation, the system 100 identified this user behavior as a particular user behavior and upon review, the loss prevention individual concurs that the automatically generated investigation has merit and escalated the automatically generated investigation to a theft investigation.

The automatically generated investigation was provided to the loss prevention individual in near real-time, therefore, the individual now in possession of the company laptop may have only taken a few steps from where the laptop was removed.

Using the PDA, the loss prevention individual furthers the automatically generated investigation (now a theft investigation) by observing temporally related video and video data available through the investigation module 800 on a PDA.

The search window 840 may automatically select a timeframe related to the investigation. The timeline may be manually controlled through the PDA.

Video and/or video data from one or more cameras listed in the camera window 830 may be selected for viewing in the viewing window 810. A plurality of video streams from individual cameras (see FIG. 1) may be viewed simultaneously by selecting an alternative viewing screen from the upper viewing control bar 812a.

The lower viewing control bar 812b allows viewing video in the viewing window 810 in real time or other selected speeds. The investigation module 800 provides an investigation playback speed wherein the playback speed is automatically calculated to replay video at a playback speed that requires the loss prevention individual to view every frame of the video sequence. Video is recorded and saved at speeds that exceed the ability of a human eye to detect slight movements. Additionally, the playback device may also have hardware and/or software limitations that prevent the playback device from displaying every frame of video. As such, playback of video at "real time" results in missing individual frames of video due to human viewing limitations and/or computer display limitations. The investigation playback speed is calculated based on the human viewing limitations and the display limitations of the particular device being used to view the investigation module 800.

Playback option window 850 allows the video sequence and/or the video from each camera to be played in various modes. The all frame display mode plays video at the calculated investigation playback speed wherein all frames are displayed and viewable during playback. The motion only display mode provides video sequences of the video that include motion. The trigger only display mode includes video sequences temporally related to a trigger.

Triggers include internal triggers and/or external triggers. Internal triggers include motion triggers defined by a user and determined by the data analytics module 140, POS triggers generated by the matching module 141 and analytics events defined by a tripline and/or a zone (e.g., entering and/or exiting a zone) and determined by the data analytics module 140. External triggers are generated by external hardware devices connected directly or indirectly to the computer 120.

At any point of the investigation the loss prevention individual may assign a video sequence to the timeline. For example, in FIG. 8 the loss prevention individual has added the second video sequence 820b to the investigation. The second video sequence 820b includes video provided from a camera positioned at the elevator and stairway. To further the scenario described hereinabove, suppose the loss prevention individual identified a suspect carrying the laptop and approaching an elevator displayed in the second video sequence 820b. In furtherance of the theft investigation, the loss prevention individual included the second video sequence 820b in the timeline of the investigation.

Loss prevention individual may select various options from the video clip window 860. The timeline window 820 may be populated with video clips including one or more video sequences, a still image generated from the video or text entered through the text entry window 814. A video clip may include a continuous video sequence. Alternatively, a video clip using the playback option of motion only (selected in the playback option window 850) includes a plurality of video sequences that include motion (e.g., non-motion portions of the video are excluded from the video clip). Finally, the loss prevention individual may capture a still image of a frame to capture an individual feature such as a facial image, a particular tool or object used during the theft, or any other significant image that may be required to further the investigation.

Finally, since the investigation is generated in near real-time, the loss prevention individual, upon confirmation of a theft currently in progress, is able to notify security and apprehend the thief before they are able to leave the premises.

Figure 9:
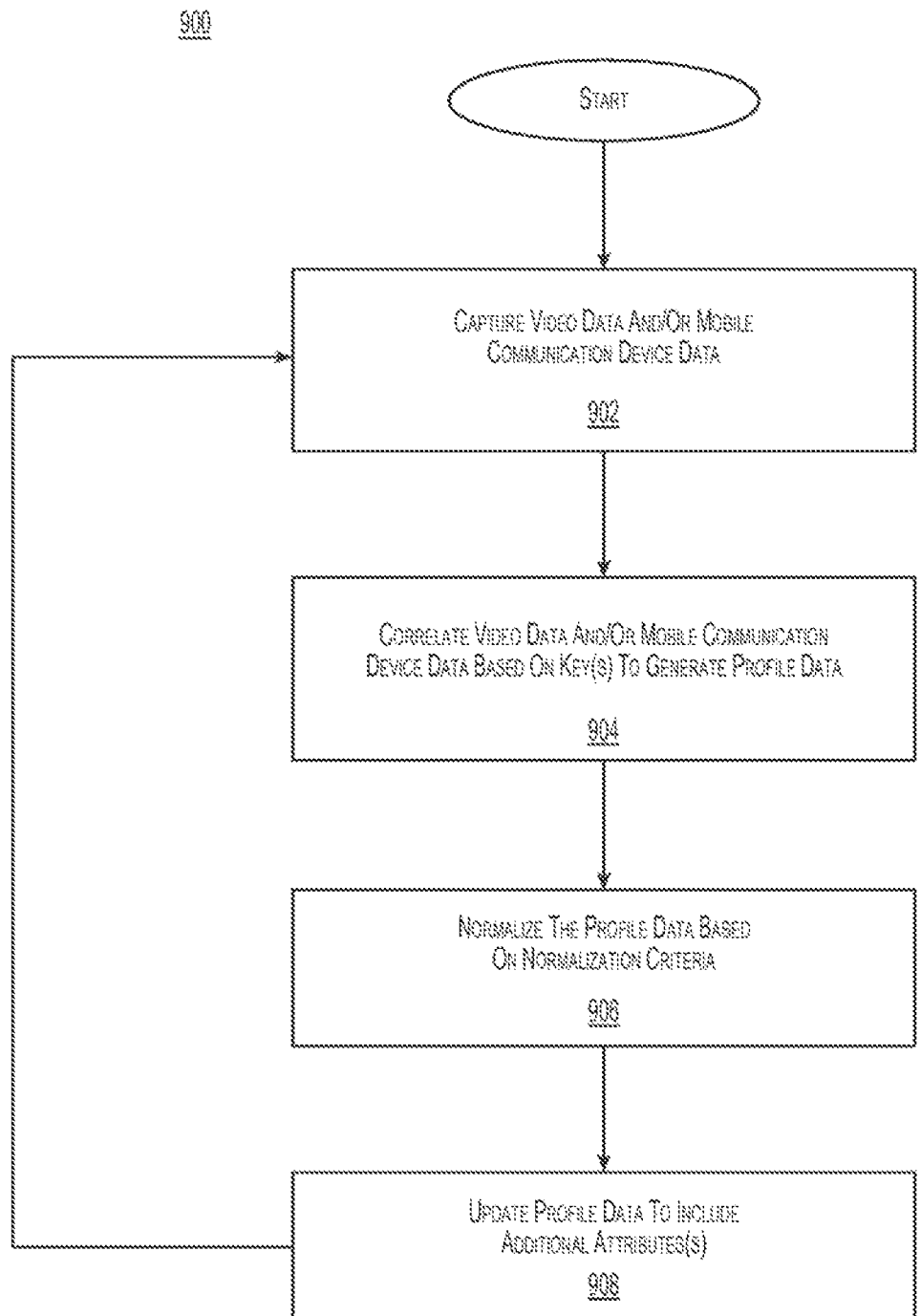
FIG. 9 is a flowchart of an analytical recognition method according to an example embodiment of the present disclosure.
Figure 10:
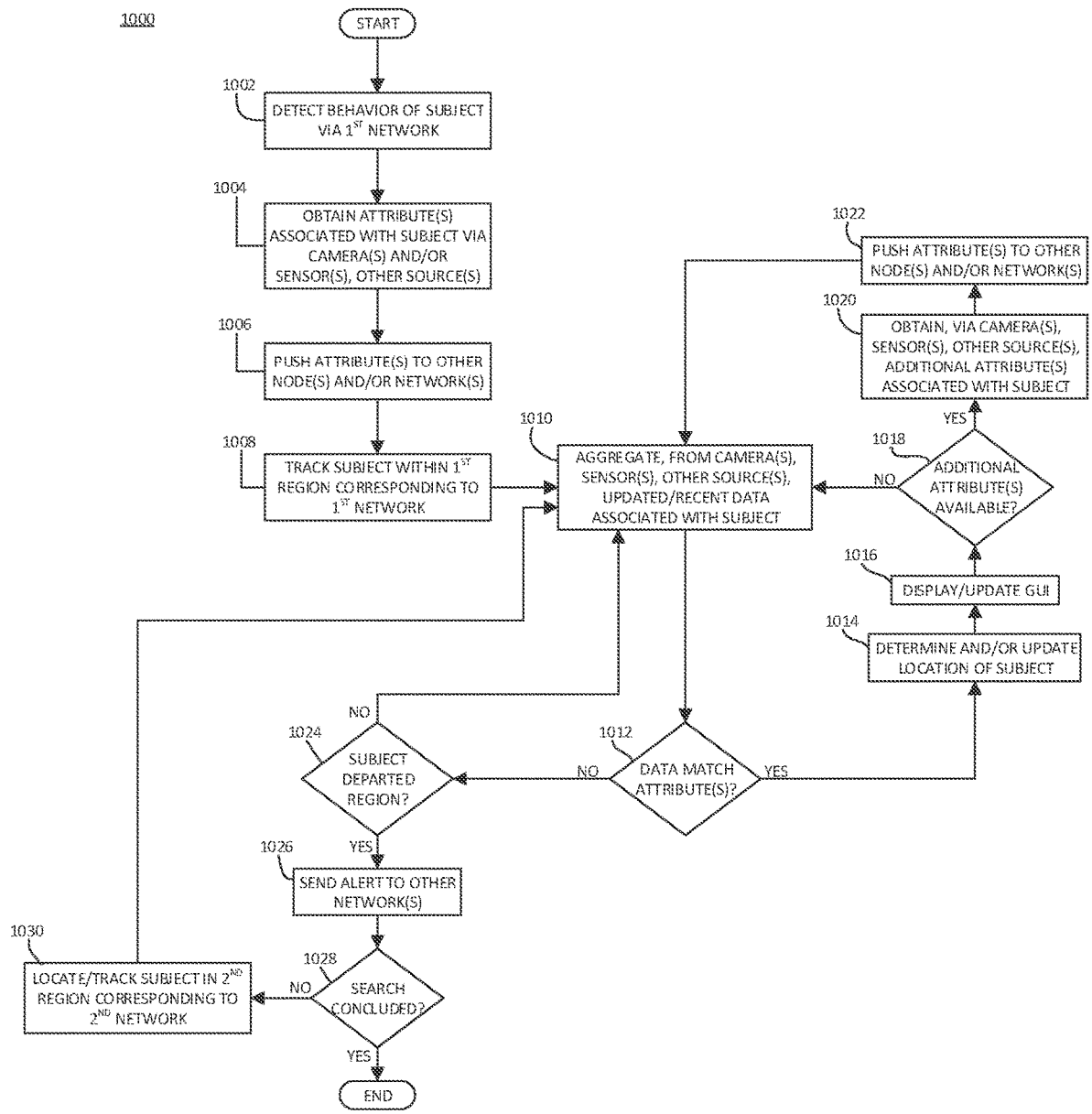
FIG. 10 is a flowchart illustrating an exemplary procedure for locating and/or tracking a location of one or more subjects in accordance with the present disclosure.

Reference will now be made to FIG. 9, which shows a flowchart of an analytical recognition method 900 according to an example embodiment of the present disclosure. In accordance with an example embodiment herein, the method 900 may be employed to populate, based at least in part on video data and/or mobile communication device data captured by one or more video cameras 110 and/or one or more antennae 150, respectively, a database with data that may be useful for security purposes, investigative purposes, marketing purposes and/or the like.

At block 902, as described above in further detail with respect to FIG. 1, video data is captured by one or more video cameras 110 and mobile communication device data is captured by one or more one or more antennae 150. The video data, in one example, includes images of one or more people who were at one time located within view of the one or more cameras 110, and the mobile communication device data includes data captured from one or more mobile communication devices 440 that were at one time located within wireless communication range of the one or more antennae 150. Each item of the mobile communication device data may be associated with a respective mobile communication device that was carried by a respective one of the people of whom one or more of the images were captured.

At block 904, the items of video data captured at block 902 are correlated to respective items of mobile communication device data captured at block 902 based on one or more keys included within the captured video data and mobile communication device data. In one example, based on the correlating at block 904, respective profiles are generated of people associated with one or more respective items of the video data and/or mobile communication device data. Each profile may have profile data including any one or a combination of the captured video data, the captured mobile communication device data, and/or additional data.

The one or more keys utilized at block 904 can include any one or a combination of attributes included within an item of video data or mobile communication device data, which can be used to identify the item of video data or mobile communication device data and/or to correlate multiple items of video data and/or mobile communication device data as being related to one another. For instance, a facial image of a person included in an item of video data captured at a first date and time may be used as a key by which that item of video data can be correlated with another item of video data captured at a second date and time. As another example, an IP address included in an item of mobile communication device data captured at a first location (e.g., by a first video camera 110 or antenna 150) may be used as a key by which that item of mobile communication device data can be correlated with another item of mobile communication device data captured at a second location (e.g., by a second video camera 110 or antenna 150). Example types of keys include, without limitation, an identifier of a collector/beacon (e.g., a unique identifier of the particular video camera 110 or antenna 150 that captured the item of video data or mobile communication device data), a mobile communication device address (e.g., a Wi-Fi address, a Bluetooth address, a NFC address, an RFID address, a cellular address, a GPS device address, a MAC address, an international mobile subscriber identity (IMSI) identifier, and/or any other suitable address or identifier) included in the mobile communication device data captured from a mobile communication device 440, a signal strength of mobile communication device data captured from a mobile communication device 440, a date on which an item of video data or mobile communication device data is captured, a time at which an item of video data or mobile communication device data is captured, a location at which an item of video data or mobile communication device data is captured, a medium (e.g., a particular wireless communication protocol) by which an item of mobile communication device data is captured, and/or the like. The keys utilized at block 904, as well as any other data captured, generated, or otherwise resulting from the steps of method 900, can be encrypted using one or more suitable encryption algorithms in a known manner.

At block 906, the profile data generated at block 904 is normalized based on one or more normalization criteria. For example, the profile data can be normalized based on (1) the number of visits that people have made to a particular location (e.g., a store location having one or more cameras 110 and antennae 150 by which video data and/or mobile communication device data was captured at block 902), (2) durations of time for which people have remained at a particular location, and/or (3) a frequency or repetition rate of visits that people have made to a particular location. This may be useful to identify repeat customers, a criminal casing a store before committing a robbery, and/or the like.

At block 908, the profile data generated at block 904 and/or normalized at block 906, is updated to include one or more attributes generated for respective profiles based on data aggregated for each profile/person over time. Examples of such attributes may include whether a person is a return shopper, a first time shopper, an employee, a passerby (e.g., as determined by a very brief duration of stay at a location, for example, where a person merely walks past a store but within range of a camera 110 and/or antenna 150 located at the store), whether the person shops at other locations of a particular retailer at which video data and/or mobile communication device data of the person was captured, whether the person was engaged by an employee while located at a store, and/or the like. After block 908, the method 900 can return to block 902, so as to continually capture video data and/or mobile communication device data as described above.

As described above, the data captured, generated, or otherwise resulting from the various steps of the method 900 can be utilized for security and/or investigative purposes (e.g., after a robbery at a store), for marketing purposes, and/or the for many other purpose. For instance, the data can be utilized in one or more front-facing or covert applications (e.g., to generate a virtual lineup for criminal investigative purposes; to enable analysis of sales or marketing data in connection with a predetermined event, such as a holiday shopping season; to compute a true conversion rate of sales encounters; to analyze customer dwelling statistics; to generate a heat map based on actual historical sales at segments within a store; to generate paths taken by a user based on data captured from multiple cameras 110 and/or antennae 150; to identify people who remain within a store after the closing hours of that store; and/or the like).

Figure 11A:
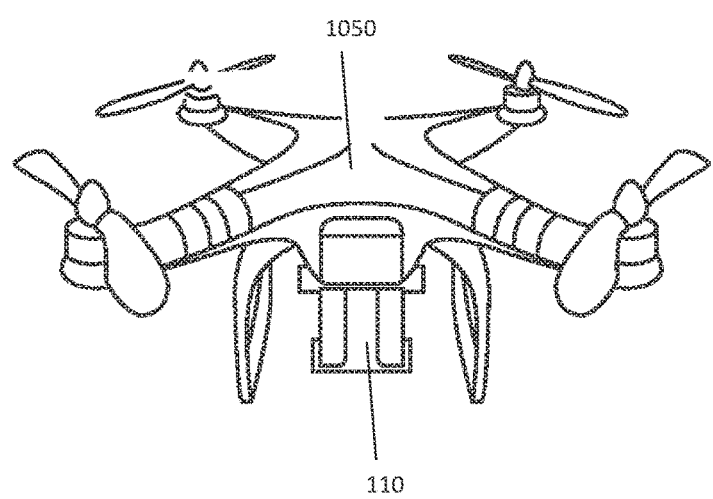
FIG. 11A is a perspective view of an aerial drone according to the present disclosure.
Figure 11B:
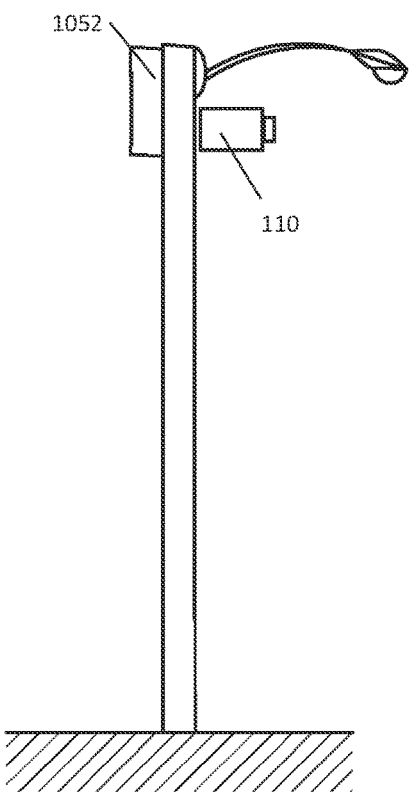
FIG. 11B is a perspective view of a traffic camera according to the present disclosure.

In various embodiments, one or more of the video cameras 110 described above with reference to FIGS. 1-8 may be disposed, included as a part of, or is coupled to, one or more aerial drones camera(s) 1050 as shown in FIG. 11A (also sometimes referred to as unmanned aerial vehicles (UAV)). In further embodiments, the camera 110 may be a traffic camera 1052 as shown in FIG. 11B, that is configured to capture images of one or more areas and/or subjects to be tracked. The aerial drone camera(s) 1050 and/or traffic camera(s) 1052 can be employed to perform various functions, such as, for example, the various functions of the video cameras 110 described above with reference to FIGS. 1-8.

In another embodiment, with reference to FIG. 9, one or more aerial drone cameras 1050 and/or traffic cameras 1052 may be employed, in conjunction with one or more other sources of information in some instances, to perform a method 1000 for locating and/or tracking a location of one or more subjects, such as a person who has been detected as having committed a crime at a particular location, across regions that correspond to one or more networks, such as an aerial drone camera network, a traffic camera network, a store camera network, and/or other types of networks. In this manner, communication among multiple nodes and/or networks, including nodes and/or networks that employ aerial drone cameras and/or traffic cameras, can cooperate to facilitate more effective location of subjects and/or tracking of locations of subjects.

At 1002, a behavior of a subject is detected in a region, such as a retail store premises, that corresponds to a first network, such as a network including cameras 110, antennas 150, and/or the like. Although the method 1000 is described in the context of a single subject or person, the method 1000 is also applicable to multiple subjects, such as a group of people who are acting together or separately. Exemplary types of behaviors that can be detected at 1002 include, without limitation, an action, an inaction, a movement, a plurality of event occurrences, a temporal event, an externally-generated event, the commission of a theft, the leaving of an unattended package, the commission of violence, the commission of a crime, and/or another type of behavior. In some example embodiments, in addition to, or as an alternative to, detecting a behavior of a subject at 1002, an abnormal situation is detected, such as an abnormal condition (pre-programmed condition(s)), an abnormal scenario (loitering, convergence, separation of clothing articles or backpacks, briefcases, groceries for abnormal time, etc.) or other scenarios based on behavior of elements (customers, patrons, people in crowd, etc.) in one or multiple video streams. For the sake of illustration, the description of the method 1000 is provided in the context of detecting a behavior of a subject at 1002, but the method 1000 is similarly applicable to detecting an abnormal situation at 1002.

Detection of the behavior of the subject includes obtaining information from one or more source(s), such as video and/or image information of the subject obtained via one or more video cameras 110 installed at or near a premises, non-video information (e.g., mobile communication device data) obtained from one or more antennas 150 installed at or near the premises, information provided by an employee or witness by way of a computer 120 at the premises, and/or other types of information obtained from other types of sources at or near the premises. Based on the obtained information, the behavior can be detected by way of the cameras 110 (in the case of smart cameras with such processing capability), and/or by a computer 120 or a server that is communicatively coupled to the cameras 110.

In various embodiments, there may be multiple types of cameras 110, such as smart cameras 110 that have processing capabilities to perform one or more of the functions described in connection with the method 1000, and non-smart cameras that lack processing capabilities to perform one or more of the functions described in connection with the method 1000. In general, any one or more of the functions described in connection with the method 1000 may be performed in a centralized manner by one or more of the cameras (or other components of networks), and/or in a distributed manner by one or more of the cameras 110 and/or the computer 120, and/or the like. Additionally, the cameras, computers, and/or other components are configured, in some aspects, to communicate with one another to cooperate to execute the various functions of the method 1000. For instance, in the event that a non-smart camera lacks processing capabilities to perform one or more of the functions described in connection with the method 1000 (for example, a particular matching algorithm), the non-smart camera may communicate information (such as, for example, raw video data) to a smart camera and/or to a computer or other device that has the processing capabilities to perform the one or more particular functions described in connection with the method 1000, so that the function(s) can be performed. Further, the non-smart camera may, in some aspects, forward to the smart camera, computer, or other device, information enabling the non-smart camera to be identified, so that if the non-smart camera captures an image of the subject, the location of the non-smart camera can be traced back and a location of the subject can be ascertained.

At 1004, one or more attributes of the subject, or associated with the subject, are obtained from one or more sources. For example, an attribute of a face of the subject may be obtained by way of an image captured by way of a video camera 110, an attribute (e.g., a color, a type, and/or the like) of a clothing item that the subject is wearing can be obtained by way of an image captured by way of a video camera 110, mobile communication device data and/or a wireless signature of a mobile communication device or PDA 123 that the subject is carrying can be obtained by way of an antenna 150, and/or the like.

At 1006, the one or more attributes that are associated with the subject and were obtained at 1004 are transmitted or pushed to one or more other nodes (e.g., video cameras 110, antennas 150, and/or other devices resident on one or more networks) and/or networks, for instance, to enable those other nodes and/or networks to locate the subject and/or track a location of the subject. The attribute(s) can be transmitted to one or more nodes and/or networks by way of the network, or any suitable wired and/or wireless communication path or network.

At 1008, a tracking loop is initiated to track a location of the subject within a first region that corresponds to the first network. The tracking loop, in some embodiments, includes performing the procedures described below in connection with 1010, 1012, 1014, 1016, 1018, 1020, and 1022 for the particular region in which the tracking is commencing. In one example, the first region is the region where the behavior of the subject was initially detected at 1002. For instance, the first region may be a retail store premises and the first network may be a network of the video cameras 110, the antennas 150, and/or the like that are installed at or near the first region. In some example embodiments, the tracking loop is performed in parallel for multiple regions (e.g., by employing multiple nodes and/or networks, such as networks of aerial drone cameras, traffic cameras, store premises, and/or the like) in to facilitate more comprehensive tracking of the location of the subject and/or to facilitate tracking of the location of the subject across a wide area. In a further embodiment, the tracking loop is performed in parallel for multiple regions corresponding to multiple networks, and the multiple networks collaborate in tracking the location of the subject to share the processing load and/or provide more accurate or rapid tracking results.

At 1010, updated and/or more recent data associated with the subject is aggregated from various sources, such as one or more of the cameras 110, antennas 150, and/or other sources. Example types of data that can be aggregated at 1010 include, without limitation, a facial image of the subject, an image of clothing worn by the subject, mobile communication device data and/or a wireless signature of a mobile communication device or PDA 123 carried by the subject, and/or other types of data.

At 1012, a determination is made as to whether one or more items of data that were aggregated at 1010 match the one or more attributes that were obtained at 1004. For example, the determination at 1012 may include comparing one or more items of data that were aggregated at 1010 to the one or more attributes that were obtained at 1004 to determine whether more recently captured data (such as, image data, video data, wireless communication device data, and/or other types of data) correspond to the subject. In this manner, the determination at 1012 can indicate whether the location of the subject in a particular region is still successfully being tracked, or whether the location of the subject is no longer successfully being tracked in the particular region and so a wider scoped search may be needed. In one example, the determination at 1012 includes comparing an attribute (e.g., of a facial image) of the subject that was obtained at 1004 to an attribute (e.g., of a facial image) of a person whose image was captured subsequent to the obtaining of the attribute at 1004 (and, in some instance, by way of a different video camera 110) to determine whether the person whose image was subsequently captured matches the subject, thereby indicating that the location of the subject is still successfully being tracked.

In some embodiments, multiple types of attribute categories are arranged in hierarchical tiers according to complexity of processing required in detecting a match at 1012. For example, a first tier of attributes for which the processing complexity required for detecting a match at 1012 is minimal may include a clothing color or hair color associated with the subject. A second tier of attributes for which the processing complexity required for detecting a match at 1012 is greater than that of the first tier of attributes may include mobile communication device data and/or wireless information relating to a mobile communication device carried by the subject and/or registered to the subject. A third tier of attributes for which the processing complexity required for detecting a match is even greater than that of the first and second tiers of attributes may include a gait of the subject. In this manner, depending on the tiers of attributes being employed for the matching at 1012, and/or depending on the processing capabilities of the cameras 110, nodes, and/or other sources, processing of the matching at 1012 can be redirected for completion by the appropriate device.

Referring now back to 1012, if it is determined at 1012 that one or more items of data that were aggregated at 1010 match the one or more attributes that were obtained at 1004 ("YES" at 1012), then the method 1000 progresses to 1014. At 1014, a location of the subject is determined based at least in part on the information aggregated at 1010 and/or on other information. For example, the determining of the location of the subject at 1014 includes, in some embodiments, computing a location of the subject based on a location of the camera 110 (or other source) from which the information was aggregated at 1010.

At 1016, information relating to the tracking of the location of the subject is displayed to a user (for example, a police officer or other emergency personnel) by way of a user interface, such as a graphical user interface (GUI). The GUI, in some examples, includes a map over which an overlay is displayed indicating a location of the subject being tracked. The GUI may also include additional information, such as one or more of the attributes of the subject being tracked, including for instance, a facial image of the subject obtained by way of one or more of the cameras 110, attributes of clothing worn by the user, an attribute of a mobile communication device carried by the user, a name or other information identifying the user generated, for instance, by matching the captured facial image of the subject to a facial image stored in a database of facial images, and/or the like. In this manner, the GUI enables the user to continually track the location of the subject throughout multiple regions that may correspond to multiple nodes and/or networks.

At 1018, a determination is made as to whether any additional attribute associated with the subject being tracked is available. In some examples, the determination at 1018 is based at least in part on one or more items of information-such as images of the subject, video of the subject, mobile communication device data and/or wireless signatures of mobile communication devices or PDAs 123 carried by the subject, and/or the like—that have been obtained thus far by way of the camera(s) 110, the antenna(s) 150, and/or other source(s). Example types of additional attributes that may be available include, without limitation, additional attributes of facial images captured of the subject having different angles and/or providing information beyond the information of previously obtained and recorded attributes, an attribute, such as a make, model, color, license plate number, of a vehicle that the subject has entered and is traveling in, and/or the like. By determining whether any additional attribute associated with the subject being tracked is available, a more comprehensive and robust profile of the subject may be compiled, thereby facilitating more accurate and efficient tracking of the location of the subject.

If it is determined at 1018 that any additional attribute associated with the subject being tracked is available ("YES" at 1018), then the method 1000 proceeds to 1020. At 1020, the additional attribute associated with the subject being tracked is obtained by way of the camera(s) 110, the antenna(s) 150, and/or the other source(s), and is stored in a memory for later use. At 1022, the additional attribute that was obtained at 1020 is transmitted or pushed to one or more other nodes and/or networks, for instance, to enable those other nodes and/or networks to more effectively locate the subject and/or track a location of the subject. From 1022, or if it is determined at 1018 that no additional attribute associated with the subject being tracked is available ("NO" at 1018), then the method 1000 proceeds back to 1010 to aggregate updated and/or more recent data associated with the subject to continually track the location of the subject throughout the region.

In some embodiments, at 1018, in addition or as an alternative to determining whether any additional attribute associated with the subject being tracked is available, a determination is made as to whether any attribute associated with the subject being tracked has changed. For example, in some cases the subject may be tracked based on multiple attributes, such as a hair color, a clothing color, a height, a vehicle make, a vehicle model, a vehicle color, a vehicle license plate, mobile communication device data, and/or the like. The multiple attributes may originate from a variety of sources, such as an image of the subject previously captured by the video camera(s) 110, mobile communication device information previously captured by the antenna(s) 150, intelligence provided by law enforcement personnel, and/or the like. In this manner, when an image of a person is obtained by way of the cameras 110 and/or mobile communication device information associated with a person is obtained by way of the antennas(s) 150, the person can be identified as matching the subject who is being tracked with a degree of confidence that is proportional to the number of attributes of the person that are detected in the image as matching the multiple attributes that serve as the basis upon which the subject is being tracked. In some cases, one of the attributes of the subject may change. For example, the subject may remove a wig, change vehicles, change clothing, and/or the like in an effort to elude tracking and capture. In such cases, it may be determined at 1018 that one or more of the multiple attributes have changed. In particular, if the cameras 110 and/or antennas 150 are no longer able to detect a person matching all of the multiple (for example, five) attributes being tracked, then the computer 120 may search for a person matching a lesser number (for example, four or fewer) of the attributes that were previously being tracked. If a person matching the lesser number of the attributes is detected by one or more of the cameras 110 and/or antennas 150, then that person may be flagged as a secondary subject to be tracked simultaneously while searching for the primary subject having attributes that match all the multiple attributes being tracked. If the person matching all of the multiple attributes is no longer locatable by the images captured via the cameras 110 and/or the information obtained by the antennas 150, then the secondary subject matching the lesser number of the attributes may be promoted to be the primary subject so that tracking resources may be appropriately and effectively allocated. In some cases, the change in attribute is verified before the secondary subject is promoted to being the primary subject. For example, the change in attribute may be verified by the processing of images captured via the cameras 110, which detect the subject discarding a clothing item or a wig. Alternatively, the change in attribute may be verified by law enforcement personnel who locate the discarded clothing item or wig. In this regard, the computer 120 may provide a location and time information to law enforcement personnel based on the last known or tracked location of the primary subject matching all of the multiple attributes, to enable the law enforcement to dispatch personnel to the location to conduct the verification. Additionally, when the subject is being tracked across multiple networks, the system 100 can push the updated list of attributes (for example, the lesser number of attributes) to one or more other nodes (e.g., cameras 110, antennas 150, and/or other devices resident on one or more networks) and/or networks. This facilitates improved adaptive tracking of subjects across multiple networks even when the subjects are expending effort to change their image to elude tracking and capture.

Referring back to 1012, if it is determined that the one or more items of data that were aggregated at 1010 do not match the one or more attributes that were obtained at 1004 ("NO" at 1012), then the method 1000 proceeds to 1024. At 1024, a determination is made as to whether the subject has departed the region in which the subject previously was being tracked, for instance, the region corresponding to the premises at which the behavior was detected at 1002. In some embodiments, the determination at 1024 is based on the amount of time that has elapsed since the location of the subject was successfully being tracked. In particular, if the amount of time that has elapsed since the location of the subject was successfully being tracked exceeds a predetermined threshold, then it is determined at 1024 that the subject has departed the region, and if the amount of time that has elapsed since the location of the subject was successfully being tracked does not exceed the predetermined threshold, then it is determined at 1024 that the subject has not departed the region.

If it is determined at 1024 that the subject has not departed the region in which the subject previously was being tracked ("NO" at 1024), then the method 1000 proceeds back to 1010 to aggregate updated and/or more recent data associated with the subject to continually track the location of the subject throughout the region. If, on the other hand, it is determined at 1024 that the subject has departed the region in which the subject previously was being tracked ("YES" at 1024), then the method 1000 progresses to 1026. At 1026, an alert is communicated to one or more other nodes and/or networks, by way of one or more wired and/or wireless communication paths, indicating that the subject has departed the first region in which the subject previously was being tracked, for instance, the region corresponding to the premises at which the behavior was detected at 1002. In some embodiments, the alert is provided to a wide area of nodes and/or networks that are adjacent and/or proximal to the region in which the subject previously was being tracked. In this manner, the additional neighboring nodes and/or networks can attempt to locate the subject and/or track a location of the subject.

In some embodiments, the alert is provided to a select set of nodes and/or networks based on one or more factors that enable more efficient allocation of tracking resources. For example, a determination may be made as to whether any traffic cameras in the region have detected a traffic law violation, such as driving through a red light. If a traffic camera in the region has detected a traffic law violation, then, based on a prediction that the traffic law violation may have been committed by the subject fleeing the scene of a crime, the alert may be provided to one or more nodes and/or networks that overlap with a region of the traffic camera in an effort to quickly locate the customer without the need to utilize a wide array of cameras and/or other resources. In addition, based on the detection at 1024 that the subject has departed the region in which the subject previously was being tracked, police or other emergency personnel can launch one or more aerial drone cameras 110 that can communicate attributes and other information with one another to facilitate a collaborative search plan, based in part on one or more neighboring regions of interest, to identify and/or track a location of the subject.

At 1028, a determination is made as to whether the searching for, and/or tracking of, the location of the subject is concluded. In some embodiments, the determination at 1028 is based on whether an instruction has been received from a police officer or other emergency personnel indicating that the search for the subject has been concluded, for instance, in a case where the subject has been apprehended and is in police custody. If it is determined at 1028 that the searching for, and/or tracking of, the location of the subject is not concluded ("NO" at 1028), then the method 1000 proceeds to 1030 where a tracking loop is initiated to identify and/or track a location of the subject within a second region that corresponds to a second network. The tracking loop, in some embodiments, includes performing the procedures described above in connection with 1010, 1012, 1014, 1016, 1018, 1020, and 1022 for the particular region in which the tracking is commencing. If, on the other hand, it is determined at 1028 that the searching for, and/or tracking of, the location of the subject is concluded ("YES" at 1028), then the method 1000 ends.

Figure 12:
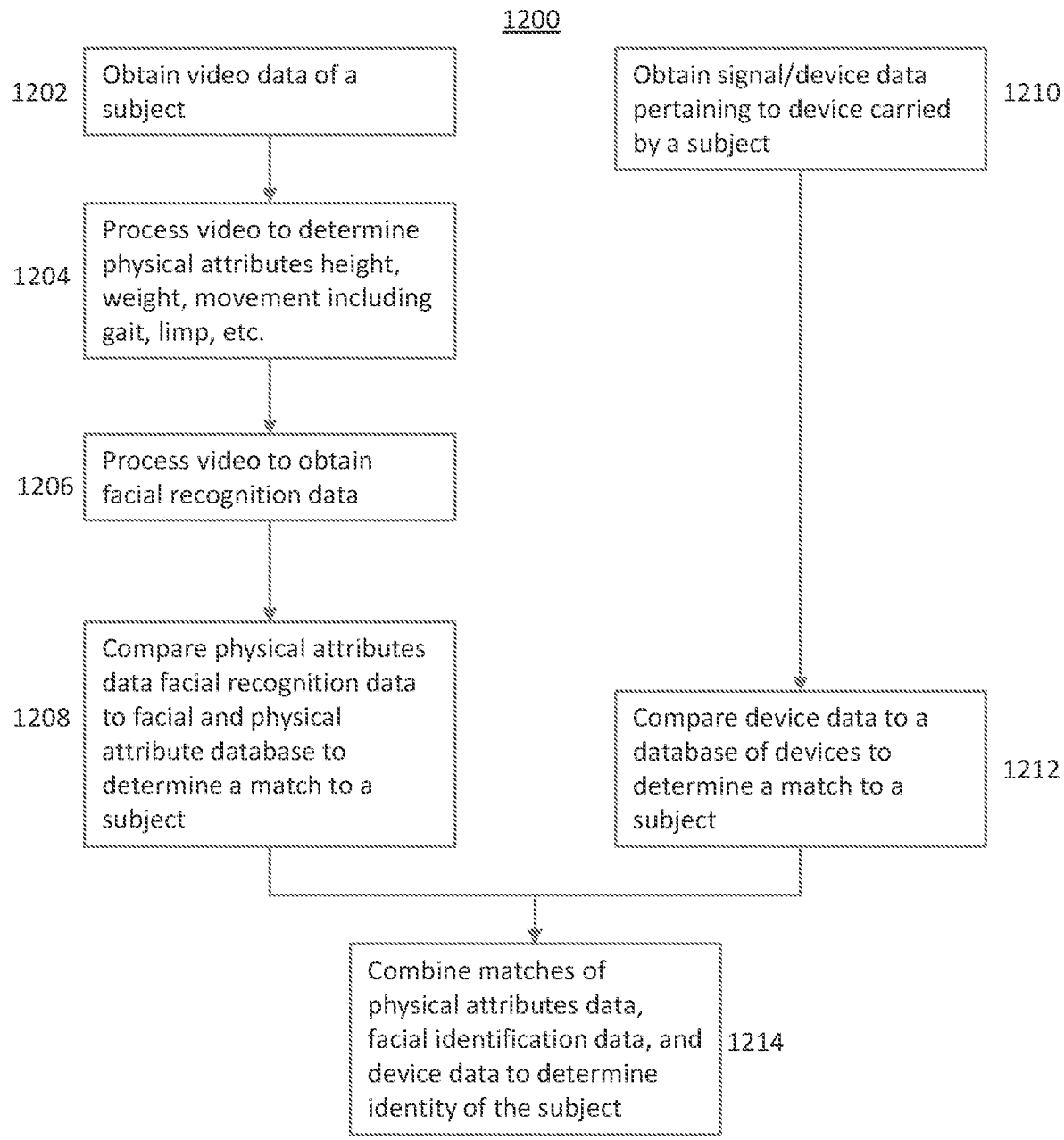
FIG. 12 is a flowchart illustrating an exemplary method for identifying one or more subjects in accordance with the present disclosure.

With reference to FIG. 12, a method 1200 for identifying a subject (i.e., person) according to the present disclosure is provided. The identification method 1200 is implemented by the analytical recognition system 100. The identification method 1200 may be combined with the method 1000, and in particular, the detection step 1002 of detection behavior of a subject.

At step 1202, video and image data of the subject is obtained, which includes obtaining information from one or more source(s), such as video and/or image data of the subject obtained via one or more video cameras 110 installed at or near a premises. In various embodiments, there may be multiple types of cameras 110, such as smart cameras 110 that have processing capabilities to perform one or more of the functions described in connection with the method 1200, and non-smart cameras that lack processing capabilities to perform one or more of the functions described in connection with the method 1200. In general, any one or more of the functions described in connection with the method 1200 may be performed in a centralized manner by one or more of the cameras (or other components of networks), and/or in a distributed manner by one or more of the cameras 110 and/or the data analytics module 140, and/or the like. Additionally, the cameras, computers, and/or other components are configured, in some aspects, to communicate with one another to cooperate to execute the various functions of the method 1200. For instance, in the event that a non-smart camera lacks processing capabilities to perform one or more of the functions described in connection with the method 1200 (for example, a particular matching algorithm), the non-smart camera may communicate information (e.g., raw video data) to a smart camera and/or to a computer or other device that has the processing capabilities to perform the one or more particular functions described in connection with the method 1200, so that the function(s) can be performed. Further, the non-smart camera may, in some aspects, forward to the smart camera, computer, or other device, information enabling the non-smart camera to be identified, so that if the non-smart camera captures an image of the subject, the location of the non-smart camera can be traced back and a location of the subject can be ascertained.

In step 1204, either the cameras 110 and/or the data analytics module 140 process the video and/or image data to determine one or more physical attributes of the subject. Suitable physical attributes include weight and height. The cameras 110 and/or the data analytics module 140 are also configured to process the video and/or image data to analyze and categorize movement of the subject and obtain the following movement parameters, which include, but are not limited to, velocity, step frequency, angle between legs, arm position, arm sway, pronation, limp, shuffle, pronation, supination, head angle, hand gestures, and the like.

In step 1206, either the cameras 110 and/or the data analytics module 140 process the video and/or image data to identify a person from a digital image, a video frame from a video source. Any suitable facial recognition method or algorithm may be used, which compares selected facial features from a given image with facial recognition data associated with a specific person within a database. The facial recognition method may be based on biometric artificial intelligence that can uniquely identify a person by analyzing patterns based on the person's facial textures and shape.

In step 1208, the physical and movement attributes from step 1204 and the facial recognition data are compared to their respect databases. In particular, the cameras 110 and/or the data analytics module 140 are configured to access a physical and movement attribute database and a facial recognition database. Each of the databases for certain individuals, e.g., previously identified subjects, includes their identity and corresponding physical and movement attributes and facial recognition data.

For each comparison, namely, comparison of the physical attribute data with the corresponding database generates a certainty match. The certainty match may be a percentage value representative of the probability that the detected physical and movement attributes match the attributes stored in the attributes databases. Similarly, with the facial recognition data, the certainty match may be a percentage value representative of the probability that the detected facial identification data matches the facial data and associated identities stored in the facial database. In embodiments, the certainty match may be from 50% to 100%.

In step 1210, signal and/or device data is obtained from one or more antennas 150 installed at or near the premises, and/or other types of information obtained from other types of sources at or near the premises. Signal and/or device data is obtained from wireless communication from the mobile communication device 440 that is being used by the subject. In embodiments, the antennas 150 may monitor wireless communication and obtain the following device parameters pertaining the mobile communication device 440 including a WiFi identifier, a media access control (MAC) identifier, a Bluetooth identifier, a cellular identifier, a near field communication identifier, and a radio frequency identifier and/or any other identifier or data associated with the mobile communication device 440.

In step 1212, the device attributes from step 1210 are compared to the device databases. The cameras 110 and/or the data analytics module 140 are configured to access a device database. The device database includes attributes of previously identified device and their owners, i.e., subjects. For the comparison of the device attributes data with the device database generates a certainty match. The certainty match may be a percentage value representative of the probability that the detected device attributes match the attributes stored in the device database. Similarly, with the facial recognition data, the certainty match may be a percentage value representative of the probability that the detected device attributes match the attributes stored in the device database. In embodiments, the certainty match may be from 50% to 100%.

In step 1214, once all three certainty match values are obtained, namely, the physical attribute match, the movement match, and the device match, these certainty match values are combined and processed by the cameras 110 and/or the data analytics module 140. In particular, the cameras 110 and/or the data analytics module 140 assign a weight factor to each of the certainty match values to generate a combined certainty match. For example, the facial certainty match may be about 65%, the movement certainty match may be about 72%, and the device match may be 80%, since each of the certainty matches is above a match threshold of 60%, the cameras 110 and/or the data analytics module 140 output a combined certainty match above 92%, which is then output by the cameras 110 and/or the data analytics module 140 to the user and/or system. If the combined certainty match is above a predetermined certainty threshold, e.g., 90% then the data analytics module 140 outputs that a positive match for the subject has been found and outputs the identity of the subject.

As various changes could be made in the above constructions without departing from the scope of the disclosure, it is intended that all matter contained in the above description shall be interpreted as illustrative and not in a limiting sense. It will be seen that several objects of the disclosure are achieved and other advantageous results attained, as defined by the scope of the following claims.

What is claimed is:

1. An analytical recognition system, comprising:
   a device configured to capture video data of a person;
   an antenna configured to capture mobile communication device data relating to a mobile communication device of the person; and
   a computing device configured to:
   analyze the video data to determine at least one attribute of the person; and
   generate a certainty match value based on the at least one attribute of the person, facial recognition data of the person, and the mobile communication device data, wherein generating the certainty match value includes:
   assigning a weight factor to each of the at least one attribute, the facial recognition data, and the mobile communication device data based on a reliability metric; and
   combining the weighted factors using a weighted sum algorithm to produce the certainty match value.

2. The analytical recognition system according to claim 1, wherein the device is at least one of a traffic camera or an aerial drone camera.

3. The analytical recognition system of claim 1, wherein the at least one attribute of the person includes at least one of a physical attribute or a movement attribute of the person.

4. The analytical recognition system of claim 1, wherein the computing device is further configured to perform a facial recognition analysis of the person to obtain the facial recognition data.

5. The analytical recognition system of claim 4, wherein the facial recognition analysis of the person is performed using biometric artificial intelligence.

6. The analytical recognition system according to claim 1, wherein the computing device is further configured to access:
   an attributes database storing a plurality of person identities and corresponding attributes;
   a facial database storing a plurality of person identities and corresponding facial recognition datasets; and
   a device database storing a plurality of person identities and corresponding mobile communication devices.

7. The analytical recognition system according to claim 1, wherein the computing device is further configured to compare the certainty match value to a certainty threshold and to output a positive match in response to the certainty match value exceeding the certainty threshold.

8. The analytical recognition system of claim 1, wherein the captured video data includes at least one of a captured still image or video footage.

9. The analytical recognition system of claim 1, wherein the mobile communication device data includes at least one of a WiFi identifier, a media access control (MAC) identifier, a Bluetooth identifier, a cellular identifier, a near field communication identifier, or a radio frequency identifier associated with a mobile communication device in communication with the antenna.

10. A method for analytical recognition of persons, the method comprising:
    capturing video data of a person from a video camera;
    capturing mobile communication device data relating to a mobile communication device of the person from an antenna;
    analyzing the video data to determine at least one attribute of the person; and
    generating a certainty match value based on the at least one attribute of the person, facial recognition data of the person, and the mobile communication device data, wherein generating the certainty match value includes:
    assigning a weight factor to each of the at least one attribute, the facial recognition data, and the mobile communication device data based on a reliability metric; and combining the weighted factors using a weighted sum algorithm to produce the certainty match value.

11. The method according to claim 10, wherein the device is at least one of a traffic camera or an aerial drone camera.

12. The method according to claim 10, wherein the at least one attribute of the person includes at least one of a physical attribute or a movement attribute of the person.

13. The method according to claim 10, further comprising:
performing a facial recognition analysis of the person to obtain the facial recognition data.

14. The method according to claim 13, wherein the facial recognition analysis of the person is performed using biometric artificial intelligence.

15. The method according to claim 10, further comprising:
accessing an attributes database storing a plurality of person identities and corresponding attributes;
accessing a facial database storing a plurality of person identities and corresponding facial recognition datasets; and
accessing a device database storing a plurality of person identities and corresponding mobile communication devices.

16. The method according to claim 10, further comprising:
comparing the certainty match value to a certainty threshold and to output a positive match in response to the certainty match value exceeding the certainty threshold.

17. The method according to claim 10, wherein the captured video data includes at least one of a captured still image and video footage.

18. The method according to claim 10, wherein the mobile communication device data includes at least one of a WiFi identifier, a media access control (MAC) identifier, a Bluetooth identifier, a cellular identifier, a near field communication identifier, or a radio frequency identifier associated with a mobile communication device in communication with the antenna.

19. A non-transitory computer-readable storage medium storing a program for causing a computer to perform a method for analytical recognition of persons, the method comprising:
capturing video data of a person from a video camera;
capturing mobile communication device data relating to a mobile communication device of the person from an antenna;
analyzing the video data to determine at least one attribute of the person; and
generating a certainty match value based on the at least one attribute of the person, facial recognition data of the person, and the mobile communication device data, wherein generating the certainty match value includes:
assigning a weight factor to each of the at least one attribute, the facial recognition data, and the mobile communication device data based on a reliability metric; and
combining the weighted factors using a weighted sum algorithm to produce the certainty match value.

20. The medium of claim 19, further comprising:
performing a facial recognition analysis of the person to obtain the facial recognition data, wherein the facial recognition analysis of the person is performed using biometric artificial intelligence.

* * * * *